(12) United States Patent
Hattori et al.

(10) Patent No.: US 7,362,881 B2
(45) Date of Patent: Apr. 22, 2008

(54) OBSTACLE DETECTION SYSTEM AND METHOD THEREFOR

(75) Inventors: Hiroshi Hattori, Tokyo (JP); Kazunori Onoguchi, Tokyo (JP); Nobuyuki Takeda, Tokyo (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 380 days.

(21) Appl. No.: 11/116,307

(22) Filed: Apr. 28, 2005

(65) Prior Publication Data

US 2005/0196034 A1 Sep. 8, 2005

Related U.S. Application Data

(62) Division of application No. 09/659,815, filed on Sep. 11, 2000, now Pat. No. 6,963,661.

(30) Foreign Application Priority Data

| Sep. 9, 1999 | (JP) | ................................. 11-255459 |
| Sep. 27, 1999 | (JP) | ................................. 11-272577 |
| Mar. 31, 2000 | (JP) | ............................ 2000-159177 |
| Apr. 3, 2000 | (JP) | ............................ 2000-100784 |

(51) Int. Cl.
*G06K 9/00* (2006.01)
*G06K 9/48* (2006.01)

(52) U.S. Cl. ...................................... 382/103; 382/199

(58) Field of Classification Search ................ 382/103, 382/154, 199, 285, 294; 345/419–427; 348/142, 348/169; 356/12, 26

See application file for complete search history.

(56) References Cited

U.S. PATENT DOCUMENTS 5,694,483 A 12/1997 Onoguchi et al.

5,748,778 A 5/1998 Onoguchi et al.
6,445,409 B1 * 9/2002 Ito et al. ..................... 348/155

FOREIGN PATENT DOCUMENTS

JP 11-102440 4/1999

OTHER PUBLICATIONS

K. Storjohann, et al., IEEE International Conference on Robotics and Automation, pp. 761-766, "Visual Obstacle Detection for Automatically Guided Vehicles", 1990.
Manolis I.A. Lourakis, et l., Asian Conference on Computer Vision II, pp. 527-534, "Visual Detection of Obstacles Assuming a Locally Planar Ground", 1998.
Q. T. Luong, et al., IEEE International Conference on Computer Vision, pp. 52-57, "An Integrated Stereo-Based Approach to Automatic Vehicle Guidance", 1995.

* cited by examiner

*Primary Examiner*—Brian Le
(74) *Attorney, Agent, or Firm*—Oblon, Spivak, McClelland, Maier & Neustadt, P.C.

(57) ABSTRACT

An obstacle detection system using stereo cameras mounted on a vehicle, to detect an obstacle existing on a ground plane at a high speed and in a high precision even with the stereo cameras being uncalibrated and with a vibration during a traveling and a change in the inclination of the ground plane. The obstacle detection system comprises: a plurality of uncalibrated TV cameras for inputting stereo images; an image storage unit 2 for storing a plurality of images inputted from the TV cameras; a feature extraction unit 3 for extracting a plurality of mutually parallel lines existing on the ground plane; a parameter computation unit 4 for determining a relation to hold between the projected positions of an arbitrary point of the ground plane upon the individual images, from the plurality of lines extracted by the feature extraction unit 3; and a detection unit 5 for detecting an object having a height from the ground plane, by using the relation determined by the parameter computation unit 4.

4 Claims, 21 Drawing Sheets

LEFT IMAGE

RIGHT IMAGE

RIGHT IMAGE → IMAGE TRANSFORMATION → TRANSFORMED IMAGE

LEFT IMAGE     TRANSFORMED IMAGE

LEFT IMAGE

RIGHT IMAGE

LEFT IMAGE

RIGHT IMAGE

IMAGE TRANSFORMATION

TRANSFORMED IMAGE

LEFT IMAGE

RIGHT IMAGE

RIGHT IMAGE

IMAGE TRANSFORMATION ➡

TRANSFORMED IMAGE

LEFT IMAGE

TRANSFORMED IMAGE

LEFT IMAGE

RIGHT IMAGE

LEFT IMAGE

RIGHT IMAGE

TRANSFORMED IMAGE

LEFT IMAGE

RIGHT IMAGE

RIGHT IMAGE

IMAGE TRANSFORMATION ⇒

TRANSFORMED IMAGE

LEFT IMAGE

TRANSFORMED IMAGE

LEFT IMAGE   RIGHT IMAGE

BOUNDARY LINE

LEFT IMAGE

RIGHT IMAGE

RIGHT IMAGE

IMAGE
TRANSFORMATION ⇒

TRANSFORMED
IMAGE

LEFT IMAGE

TRANSFORMED
IMAGE

OBSTACLE DETECTION SYSTEM AND METHOD THEREFOR

BACKGROUND OF THE INVENTION

1. Technical Field

The present invention relates to an obstacle detection system for detecting an obstacle existing on a ground, such as a preceding vehicle, a pedestrian or a parked vehicle with cameras mounted on a vehicle, so as to support the safe drive of an automobile.

2. Background Art

The technology for detecting an obstacle with a sensor is coarsely divided into one utilizing a laser beam or ultrasonic waves and one utilizing TV cameras. The technology utilizing the laser beam costs high and is impractical. On the other hand, the technology utilizing the ultrasonic waves has a low resolution so that it is troubled by the detection precision of the obstacle.

On the contrary, the TV cameras are relatively inexpensive so that they are suitable for the obstacle detection from the aspects of the resolution, the measuring precision and the measuring range. In the case of using the TV cameras, there are methods of employing one camera and a plurality of cameras (or stereo cameras).

In the method of employing the single camera, the ground region and the obstacle region are separated with the clue of the informations such as the intensities, colors or textures of one image taken by the camera. For example, the intermediate intensity region of a low chroma, i.e., a gray region is extracted from the image to determine the ground region or a region of few textures so that the ground region is extracted while leaving the remaining region as the obstacle region. However, there are many obstacles having intensities, colors or textures similar to those of the ground. Therefore, this method finds it difficult to separate the obstacle region and the ground region under the general situations.

On the contrary, the method using a plurality of cameras detects the obstacle with a clue to three-dimensional informations. The technology for obtaining the three-dimensional informations of an object scene by using the plurality of cameras is generally called the "stereo vision". According to this stereo vision, given corresponding points between stereo images, it is possible to determine the three dimensional position. If the positions and orientations of the individual cameras with respect to the ground plane are predetermined, the height of an arbitrary point in the images from the ground plane can be obtained by the stereo vision. Depending upon the presence or absence of the height, therefore, it is possible to separate the obstacle region and the ground region. It is difficult for the method using the single camera to detect the region having intensities, colors and textures similar to those of the ground, as the obstacle. According to the stereo vision, however, the obstacle is detected with a clue to the height from the ground plane so that the obstacle detection can be made in a more general scene.

The ordinary stereo vision is a technology for determining the distances of an arbitrary point on the image from the stereo cameras. For this technology, it is necessary to determine parameters in advance on the spacing and directions of the plurality of cameras and the focal lengths and the principal points of the camera lenses. The work for determining the parameters is called the "calibration". For this calibration, there are prepared a number of points, the three-dimensional locations of which are known. The projected locations of the points on the images are determined to compute the parameters on the locations and positions of the cameras and the focal lengths of the camera lenses. However, these operations require a long time and many works to obstruct the practical obstacle detection by the stereo vision.

If it is sufficient to separate the ground region and the obstacle region on the images, however, the calibrations are not necessarily required. If the projected points of a point of the ground plane on the left and right images are designated by $(u_l, v_l)$ and $(u_r, v_r)$, the following relation holds:

$$u_r = \frac{h_{11}u_l + h_{12}v_l + h_{13}}{h_{31}u_l + h_{32}v_l + h_{33}}, \quad v_r = \frac{h_{21}u_l + h_{22}v_l + h_{23}}{h_{31}u_l + h_{32}v_l + h_{33}} \quad (1)$$

$h=(h_{11}, h_{12}, h_{13}, h_{21}, h_{22}, h_{23}, h_{31}, h_{32}, h_{33})^T$ (T designates a transposition symbol) are parameters depending upon the locations and positions of the individual cameras with respect to the ground plane and upon the focal lengths and image origins of the lenses of the individual cameras. The parameters h are predetermined from the projected points of four or more points of the ground plane on the left and right images. By using these relations, the corresponding point P' $(u_r, v_r)$ on the right image is determined when it is assumed that an arbitrary point $P(u_l, v_l)$ on the left image is present on the ground plane.

If the point P is present on the ground plane, the points P and P' are a set of the correct corresponding points so that the difference between their intensities becomes small. When the points P and P' have largely different intensities, therefore, it is decided that the point P belongs to the obstacle region. In the following, Equation 1 will be called the "ground plane constraint".

In this method, the search for corresponding points is also unnecessary. The ordinary stereo method requires the search for matching points between the left and right images so that its computation cost is high because the correspondence is made by the search computation. However, the aforementioned method requires no correspondence search so that the computational cost is extremely inexpensive.

If the stereo cameras are fixed in the three-dimensional space, the obstacle existing on the ground plane can be detected by the parameters H once determined. While the vehicle is running, however, the relative geometric relationship between the ground plane and the individual cameras are changed time after time by the vibration of the vehicle itself and the change in the inclination of the ground. In short, the parameters h change during the traveling so that the ground plane constraint determined at a still time cannot be used for the obstacle detections during the traveling.

In order to solve this problem, there has been usually used a method for detecting the obstacle by computing the ground plane constraint using a number of featuring points (e.g., the corner points of the paints on the ground) on the ground plane. It is, however, difficult to extract the numerous featuring points on the ground plane, and it frequently occurs that the featuring points on the obstacle are erroneously extracted. Moreover, the correspondence search of the extracted featuring points has to be performed to raise the computation cost. Also, with the large number of parameters to be determined, there has been a problem that it is seriously difficult to determine the ground plane constraint stably.

OBJECTS OF THE INVENTION

As described hereinbefore, the obstacle detection system is coarsely divided into one using the laser beam or the ultrasonic waves and one using the TV cameras. However, the obstacle detection system utilizing the laser beam and the ultrasonic waves is troubled by its high price or by its low measurement precision.

On the other hand, the obstacle detection system utilizing the TV cameras is troubled by a limited using environment, by the necessity for the calibration requiring the long time and the many works, by the necessity for the correspondence search of the left and right images of the high computation cost, and by the absence of the practical counter-measures for the vibration during the traveling of the vehicle and the inclination of the ground.

Therefore, the present invention has been conceived in view of the aforementioned background and contemplates to provide an obstacle detection system and a method therefor, which is enabled to detect an obstacle existing on the ground plane at a high speed even with the vibration during a traveling and an inclination of the ground itself, by determining the geometric relations between the ground plane and the individual cameras with less troubles of the calibration and using two lines segmenting the driving lane.

DISCLOSURE OF THE INVENTION

According to the invention of claim 1, there is provided an obstacle detection system comprising:
a plurality of TV cameras for inputting an image;
an image storage unit for storing a plurality of images inputted from the TV cameras;
a feature extraction unit for extracting a line existing in a plane of a three-dimensional space, from the images;
a parameter computation unit for determining a relation to hold between the projected positions of an arbitrary point in the plane upon the individual images, from the line extracted by the feature extraction unit; and
a detection unit for detecting a region absent from the plane, by using the relation computed by the parameter computation unit.

According to the invention of claim 2, there is provided an obstacle detection system according to claim 1,
wherein the TV cameras are unknown on their relative positions and orientations and on their focal lengths and principal points.

According to the invention of claim 3, there is provided an obstacle detection system according to claim 1 or 2,
wherein the relation to hold between the projected points of an arbitrary point of the plane in the three-dimensional space upon the individual images is expressed by a two-dimensional affine transformation thereby to determine the affine transformation parameters.

According to the invention of claim 4, there is provided an obstacle detection system according to any of claims 1 to 3,
wherein the feature extraction unit extracts a plurality of lines, as existing on the plane in the three-dimensional space and parallel to each other in the three-dimensional space, from the images, and determines the vanishing points of the lines.

According to the invention of claim 5, there is provided an obstacle detection system according to any of claims 1 to 3,
wherein the feature extraction unit extracts a plurality of lines, as existing on the plane in the three-dimensional space and parallel to each other in the three-dimensional space, from the images, and determines the inclinations of the lines on the images and the vanishing points of the lines.

According to the invention of claim 6, there is provided an obstacle detection system comprising:
a plurality of image pickup units having light receiving units disposed on a driver's own vehicle at a substantial spacing from each other for taking the regions, to which the light receiving units are directed, simultaneously as images;
an image storage unit for storing the images taken by the image pickup units;
a feature extraction unit for extracting such ones of the regions taken by the image pickup units as correspond to parallel members disposed generally in parallel with each other on a plane, as can be traveled by the own vehicle, from the first image taken by the first image pickup unit and the second image taken by the second image pickup unit, as stored in the image storage unit, to determine a point of intersection at which the extracted regions intersect in the first and second images;
a difference detection unit for determining the corresponding region in the second image, as corresponding to an arbitrary region in the first image, assuming that the arbitrary region is caused by the plane, from the epipolar constraint to hold between the extracted region and the first and second images, to compare the intensities of the arbitrary region and the corresponding region, thereby to extract the region having a substantially different intensity as an obstacle region to obtain an obstacle region image from the extracted result; and
a height computation unit for extracting a polygonal region, as composed of an intensity higher than a standard value, of the obstacle region image thereby to detect as a true obstacle region the polygonal region of a threshold or higher value of the ratio which is determined from the vertical size of the polygonal region in the obstacle region image and the size from the lower end of the polygonal region to the scan-line including the vanishing point for the lines on a plane.

According to the invention of claim 7, there is provided an obstacle detection system comprising:
a plurality of image pickup units having light receiving units disposed at a substantial spacing from each other for taking the regions, to which the light receiving units are directed, simultaneously as images;
an image storage unit for storing the images taken by the image pickup units;
a difference detection unit for determining the corresponding region in the second image, as corresponding to an arbitrary region in the first image, assuming that the arbitrary region is caused by a plane in a three-dimensional space, to compare the intensities of the arbitrary region and the corresponding region, thereby to extract the region having a substantially different intensity as an obstacle region to obtain an obstacle region image from the extracted result; and
a height computation unit for extracting a polygonal region, as composed of an intensity higher than a standard value, of the obstacle region image thereby to detect as a true obstacle region the polygonal region of a threshold or higher value of the ratio which is determined from the vertical size of the polygonal region in the obstacle region image and the size from the lower end of the polygonal region to the scan-line set in the obstacle region image.

According to the invention of claim 8, there is provided an obstacle detection system comprising:

a first image pickup unit and a second image pickup unit for obtaining a first image information of a first image and a second image information of a second image, respectively, by taking the surrounding region of a driver's own vehicle substantially simultaneously as images formed of a set of pixels from light receiving units arranged at a spacing on the own vehicle;

an image information storage unit for storing the first image information and the second image information;

an intensity difference image forming unit for forming an intensity difference image by determining the corresponding pixels in the second image of the second image information, as assuming that an arbitrary pixel of the first image of the first image information stored in the image information storage unit exists on the ground plane being traveled by the own vehicle, to determine the intensity difference between the arbitrary pixel and the corresponding pixel;

a discrimination image forming unit for obtaining a discrimination image by discriminating each pixel in the intensity difference image into a pixel having an intensity difference no less than a standard value and a pixel having an intensity difference less than the standard value; and a decision unit for detecting and deciding a region having a generally wedge-shaped set of pixels in the discrimination image as an obstacle region.

According to the invention of claim 9, there is provided an obstacle detection system according to claim 8, wherein the detection unit decides that the lowermost pixel in the wedge-shaped region of the discrimination image is either at a point of contact between the obstacle region in the first or second image, as corresponding to the discrimination image, and the ground being traveled by the own vehicle, or at a portion of the obstacle region and the closest to the own vehicle.

According to the invention of claim 10, there is provided an obstacle detection system according to claim 8 or 9, wherein the detection unit decides that such one of the generally wedge-shaped region existing generally in the scan-line direction of the first and second images, as corresponding to the discrimination image, that its side is at a higher location of the first and second images than the apexes opposed thereto, is the obstacle region.

According to the invention of claim 11, there is provided an obstacle detection system according to claim 8, wherein the detection unit decides one pair of wedge-shaped regions generally of the same shape, as located at a spacing on the generally identical scan-line in the discrimination image, and decides the region between the paired wedge-shaped regions as the obstacle.

According to the invention of claim 12, there is provided an obstacle detection system comprising:

an image input unit for inputting and storing at least two images of different pickup points;

a feature extraction unit for extracting a projected point of a motion of an object, as stands still or moves on a plane in a three-dimensional space with respect to the pickup point of a standard image, upon the standard image corresponding to an infinite point, by employing one of the images stored by the image input unit as the standard image and the other as a reference image;

a detection unit for calculating a corresponding point on the reference image when it is assumed that an arbitrary point on the standard image is on the plane, to detect a point non-existing on the plane from the intensity difference between the arbitrary point and the corresponding point; and a contact time computing unit for computing the time period for the point non-existing on the plane to come to the taken point of the standard image, on the basis of the point non-existing on the plane in the standard image detected by the detection unit and the projected point extracted from the feature extraction unit.

According to the invention of claim 13, there is provided an obstacle detection system according to claim 12, wherein the contact time computation unit computes the time period for the point on the boundary with the plane to come to the taken point of the standard image, on the basis of such ones of the points detected by the detection unit but not existing on the plane, as are located on the boundary line with the plane in the standard image and are extracted as the projected point by the feature extraction unit.

According to the invention of claim 14, there is provided an obstacle detection system according to claim 12 or 13, wherein the feature extraction unit extracts a plurality of lines aligned to the direction of the motion of an object which stands still or moves on the plane relative to the pickup point of the standard image, to employ the point of intersection of the extracted lines, as the projected point.

According to the invention of claim 15, there is provided an obstacle detection system according to any claims 12 to 14, wherein the parameters are unknown including camera positions, orientations, the focal lengths and principal points.

According to the invention of claim 16, there is provided an obstacle detection system according to any of claims 12 to 15, wherein the detection unit computes the corresponding point on the reference image when the arbitrary point on the standard image is assumed to be on the plane, to detect the non-existing point from a similarity of the surrounding intensities of the arbitrary point and the corresponding point.

According to the invention of claim 17, there is provided an obstacle detection method comprising:

an image storage step of storing a plurality of images inputted from a plurality of TV cameras;

a feature extraction step of extracting a line existing in a plane of a three-dimensional space, from the images;

a parameter computation step of determining a relation to hold between the projected positions of an arbitrary point in the plane upon the individual images, from the line extracted at the feature extraction step; and a detection step of detecting a region absent from the plane, by using the relation computed at the parameter computation step.

According to the invention of claim 18, there is provided an obstacle detection method according to claim 17, wherein the TV cameras are unknown on their relative locations and positions and on their focal lengths and principal points.

According to the invention of claim 19, there is provided an obstacle detection method according to claim 17 or 18, wherein the parameter computation step expresses the relation to hold between the projected points of an arbitrary point of the plane in the three-dimensional space upon the individual images by a two-dimensional affine transformation thereby to determine the affine transformation parameters.

According to the invention of claim 20, there is provided an obstacle detection method according to any of claims 17 to 19, wherein the feature extraction step extracts a plurality of lines, as existing on the plane in the three-dimensional space and parallel to each other in the three-dimensional space, from the images, and determines the vanishing points of the lines.

According to the invention of claim 21, there is provided an obstacle detection method according to any of claims 17 to 19, wherein the feature extraction step extracts a plurality of lines, as existing on the plane in the three-dimensional space and parallel to each other in the three-dimensional space, from the images, and determines the inclinations of the lines on the images and the vanishing points of the lines.

According to the invention of claim 22, there is provided an obstacle detection method comprising:

a plurality of image pickup steps of taking the regions, to which light receiving units disposed on a driver's own vehicle at a substantial spacing from each other are directed, simultaneously as images;

an image storage step of storing the images taken by the image pickup steps;

a feature extraction step of extracting such ones of the regions taken by the image pickup steps as correspond to parallel members disposed generally in parallel with each other on a plane, as can be traveled by the own vehicle, from the first image taken by the first image pickup step and the second image taken by the second image pickup step, as stored in the image storage step, to determine a point of intersection at which the extracted regions intersect in the first and second images;

a difference detection step of determining the corresponding region in the second image, as corresponding to an arbitrary region in the first image, assuming that the arbitrary region is caused by the plane, from the epipolar constraint to hold between the extracted region and the first and second images, to compare the intensities of the arbitrary region and the corresponding region, thereby to extract the region having a substantially different intensity as an obstacle region to obtain an obstacle region image from the extracted result; and a height computation step of extracting a polygonal region, as composed of an intensity higher than a standard value, of the obstacle region image thereby to detect as a true obstacle region the polygonal region of a threshold or higher value of the ratio which is determined from the vertical size of the polygonal region in the obstacle region image and the size from the lower end of the polygonal region to the scan-line in the obstacle region image including the intersection point.

According to the invention of claim 23, there is provided an obstacle detection method comprising:

a plurality of image pickup steps of taking the regions, to which the light receiving units disposed at a substantial spacing from each other are directed, simultaneously as images;

an image storage step of storing the images taken by the image pickup steps;

a difference detection step of determining the corresponding region in the second image, as corresponding to an arbitrary region in the first image, assuming that the arbitrary region is caused by a plane in a three-dimensional space, to compare the intensities of the arbitrary region and the corresponding region, thereby to extract the region having a substantially different intensity as an obstacle region to obtain an obstacle region image from the extracted result; and a height computation step of extracting a polygonal region, as composed of an intensity higher than a standard value, of the obstacle region image thereby to detect as a true obstacle region the polygonal region of a threshold or higher value of the ratio which is determined from the vertical size of the polygonal region in the obstacle region image and the size from the lower end of the polygonal region to the scan-line set in the obstacle region image.

According to the invention of claim 24, there is provided an obstacle detection method comprising:

a first image pickup step and a second image pickup step of obtaining a first image information of a first image and a second image information of a second image, respectively, by taking the surrounding region of a driver's own vehicle substantially simultaneously as images formed of a set of pixels from light receiving units arranged at a spacing on the own vehicle;

an image information storage step of storing the first image information and the second image information;

an intensity difference image forming step of forming an intensity difference image by determining the corresponding pixels in the second image of the second image information, as assuming that an arbitrary pixel of the first image of the first image information stored in the image information storage step exists on the ground plane being traveled by the own vehicle, to determine the intensity difference between the arbitrary pixel and the corresponding pixel;

a discrimination image forming step of obtaining a discrimination image by discriminating each pixel in the intensity difference image into a pixel having an intensity difference no less than a standard value and a pixel having an intensity difference less than the standard value; and a decision step of detecting and deciding a region having a generally wedge-shaped set of pixels in the discrimination image as an obstacle region.

According to the invention of claim 25, there is provided an obstacle detection method according to claim 24, wherein the detection step decides that the lowermost pixel in the wedge-shaped region of the discrimination image is either at a point of contact between the obstacle region in the first or second image, as corresponding to the discrimination image, and the ground being traveled by the own vehicle, or at a portion of the obstacle region and the closest to the own vehicle.

According to the invention of claim 26, there is provided an obstacle detection method according to claim 24 or 25, wherein the detection step decides that such one of the generally wedge-shaped region existing generally in the scan-line direction of the first and second images, as corresponding to the discrimination image, that its side is at a higher location of the first and second images than the apexes opposed thereto, is the obstacle region.

According to the invention of claim 27, there is provided an obstacle detection method according to claim 24, wherein the detection step decides one pair of wedge-shaped regions generally of the same shape, as located at a spacing on the generally identical scan-line in the discrimination image, and decides the region between the paired wedge-shaped regions as the obstacle.

According to the invention of claim 28, there is provided an obstacle detection method comprising:

an image input step of inputting and storing at least two images of different pickup points;

a feature extraction step of extracting a projected point of a motion of an object, as stands still or moves on a plane in a three-dimensional space with respect to the pickup point of a standard image, upon the standard image corresponding to an infinite point, by employing one of the images stored by the image input step as the standard image and the other as a reference image;

a detection step of calculating a corresponding point on the reference image when it is assumed that an arbitrary point on the standard image is on the plane, to detect a point non-existing on the plane from the intensity difference between the arbitrary point and the corresponding point; and a contact time computation step of computing the time period for the point non-existing on the plane to come to the taken point of the standard image, on the basis of the point non-existing on the plane in the standard image detected by the detection step and the projected point extracted from the feature extraction step.

According to the invention of claim 29, there is provided an obstacle detection method according to claim 28, wherein the contact time computation step computes the time period for the point on the boundary with the plane to come to the taken point of the standard image, on the basis of such ones of the points detected by the detection step but not existing on the plane, as are located on the boundary line with the plane in the standard image and are extracted as the projected point by the feature extraction step.

According to the invention of claim 30, there is provided an obstacle detection method according to claim 28 or 29, wherein the feature extraction step extracts a plurality of lines aligned to the direction of the motion of an object which stands still or moves on the plane relative to the pickup point of the standard image, to employ the point of intersection of the extracted lines, as the projected point.

According to the invention of claim 31, there is provided an obstacle detection method according to any claims 28 to 30, wherein the images are unknown on the relative locations and positions of their pickup points and on their focal lengths and principal points.

According to the invention of claim 32, there is provided an obstacle detection method according to any of claims 28 to 31, wherein the detection step computes the corresponding point on the reference image when the arbitrary point on the standard image is assumed to be on the plane, to detect the non-existing point from a similarity of the surrounding intensities of the arbitrary point and the corresponding point.

BEST MODES FOR CARRYING OUT THE INVENTION

Embodiment 1

Embodiment 1 of the invention will be described with reference to the accompanying drawings.

Figure 1:
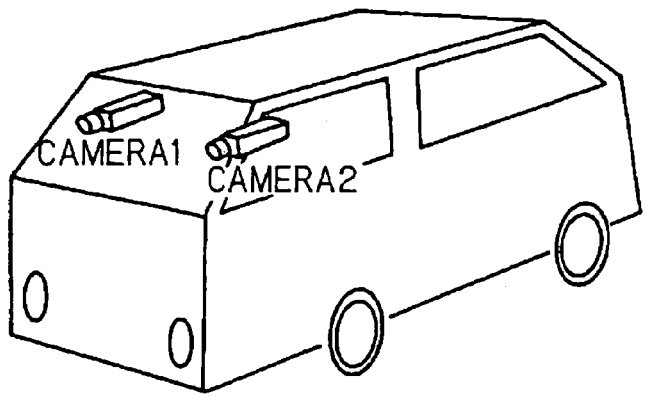
FIG. 1 shows an example of Embodiment 1.

In this Embodiment, there is imagined a situation that an obstacle existing on a ground plane such as a pedestrian, a preceding vehicle or a parked vehicle is detected by two left and right stereo cameras mounted on a vehicle, as shown in FIG. 1.

Figure 2:
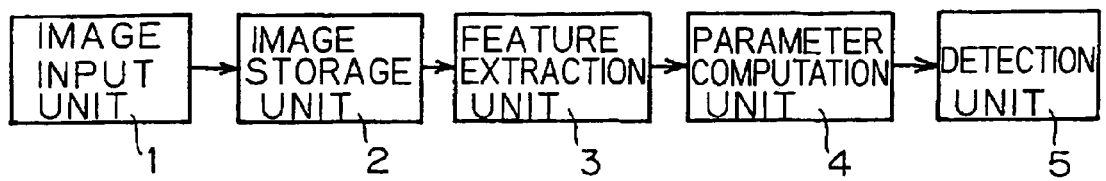
FIG. 2 shows an entire construction of Embodiment 1.

FIG. 2 shows a schematic construction of the obstacle detection system according to this Embodiment. This obstacle detection system is constructed to include an image input unit 1, an image storage unit 2, a feature extraction unit 3, a parameter computation unit 4 and a detection unit 5. The obstacle detection system predetermines, in a still state, a relation (as will be called the "ground plane constraint") to hold between the projected positions of a point of a ground plane upon left and right images, and computes the ground plane constraint at a traveling time, as changed time after time by the vibration of the driven vehicle and the inclination of the ground, exclusively from the motions of two white lines existing on the ground, thereby to discriminate an obstacle existing on the ground plane and the ground region.

Figure 3:
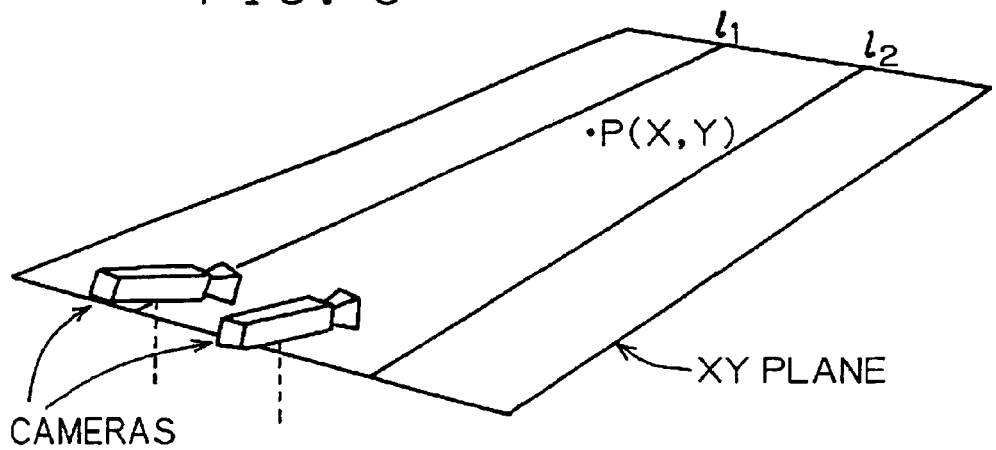
FIG. 3 is a diagram for explaining a stereo camera coordinate system.

In this Embodiment, as shown in FIG. 3, there is set the stereo camera coordinate system in which two white lines on the two ground ends are designated by $1_1$ and $1_2$, in which a Y-axis is taken in the direction of the straight lines $1_1$ and $1_2$ whereas an X-axis and a Z-axis are taken in the transverse and vertical directions, respectively, and in which an X-Y plane is taken in a flat plane (or a standard plane) having no inclination. The image input unit 1 inputs two images by using two left and right TV cameras. These two cameras need not be predetermined in their locations and positions, but it is assumed that the individual cameras are fixed on the vehicle and not changed during the traveling.

The image storage unit 2 stores an image memory with the two images inputted from the image input unit 1.

Figure 6:
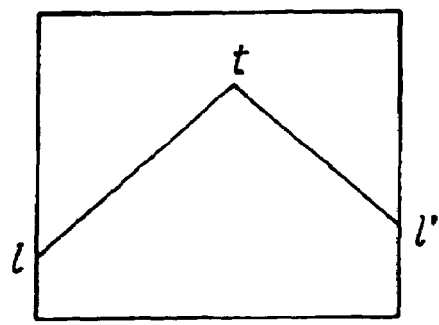
FIG. 6 is a diagram for explaining two white lines on the two ends of a ground and their vanishing point.

The feature extraction unit 3 detects the two straight lines $1_1$ and $1_2$, as shown in FIG. 6, on the two images stored by the image storage unit 2 and determines their point of intersection (or vanishing point). This straight line detection is performed by using the edge extraction processing and the Hough transformation.

The parameter computation unit 4 computes the ground plane constraint at the traveling time from both the ground plane constraint with respect to the standard plane determined at the still time and the two white lines and their vanishing point determined by the feature extraction unit 3. Here will be described this method. If the projected point of a point (X, Y, Z) in a three-dimensional space is designated by (u, v), the following relation generally holds:

$$u = \frac{h_{11}X + h_{12}Y + h_{13}Z + t_1}{h_{31}X + h_{32}Y + h_{33}Z + t_3} \quad (2)$$

$$v = \frac{h_{21}X + h_{22}Y + h_{23}Z + t_2}{h_{31}X + h_{32}Y + h_{33}Z + t_3} \quad (3)$$

wherein $h = (h1_1, h1_2, ---, \text{ and } t_3)^T$ is a parameter relating to the locations, the positions, the focal lengths and the principal points of the cameras. Since this parameter h indicates the same camera model, even if multiplied by a constant, the generality is not lost even if an arbitrary element of the parameter h is assumed to be "1". Therefore, $h_{32}$ will be set to $h_{32}=1$.

In the stereo camera coordinate system shown in FIG. 3, the ground plane (or standard plane) is expressed by Z=0 so that the projected point of the point P(X, Y) on the ground plane is expressed by substituting Z=0 into the foregoing Formula:

$$u = \frac{h_{11}X + h_{12}Y + t_1}{h_{31}X + Y + t_3}, \quad v = \frac{h_{21}X + h_{22}Y + t_2}{h_{31}X + Y + t_3} \quad (4)$$

Here will be considered the camera model under the following premises:
(a) The target area is relatively distant from the stereo cameras;
(b) The longitudinal difference between the left and right camera positions.

Figure 5:
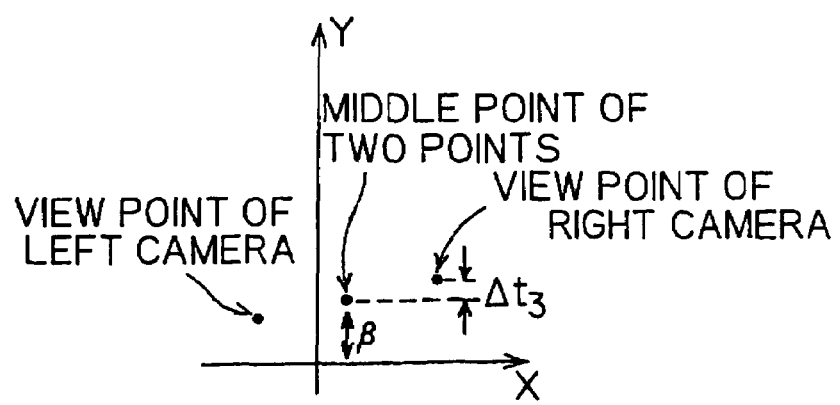
FIG. 5 is a diagram for explaining a parameter β.

Under these premises, the following Formula holds:

[Denominator of Formula (4)]

$$= Y + \beta + h_{31}X + \Delta t_3 \approx Y + \beta \quad (5)$$

wherein letter β indicates a displacement, as shown in FIG. 5, in the Y-direction between the middle point of the view points of the left and right cameras and the origin of the coordinate, and $t_3 = \beta + \Delta t_3$.

Therefore, Equation (4) can be simplified, as follows:

$$u \simeq \frac{h_{11}X + h_{12}Y + t_1}{Y + \beta}, \quad v \simeq \frac{h_{21}X + h_{22}Y + t_2}{Y + \beta} \quad (6)$$

If $Y_c = Y + \beta$, $$\begin{bmatrix} u \\ v \end{bmatrix} = \begin{bmatrix} h_{11} & t_1 - \beta h_{12} \\ h_{21} & t_2 - \beta h_{22} \end{bmatrix} \begin{bmatrix} X/Y_C \\ 1/Y_C \end{bmatrix} + \begin{bmatrix} h_{12} \\ h_{22} \end{bmatrix} \quad (7)$$

The matrix of the right side is designated by M. If the point of intersection (or vanishing point) of the white lines l1 and l2 is expressed by $t = (u_0, v_0)^T$, $(h_{12}, h_{22})^T = t$. If $X = (X/Y_c, 1/Y_c)^T$ and if the projected points of the point P of the ground plane on the left and right images are designated by $u_l$ and $u_r$, the following Formula is obtained ($t_l$ and $t_r$ are the vanishing point of the white lines):

$$u_l - t_l = M_l X, \quad u_r - t_r = M_r X \quad (8)$$

Therefore, the following Formula is obtained:

$$u_r - t_r = M_r M_l^{-1}(u_l - t_l) = A(u_l - t_l) \quad (9)$$

Here, letters "l" and "r" designate suffixes to the left and right images, respectively. Since the stereo cameras are not calibrated, letters $M_l$ and $M_r$ have unknown values, but letter A is predetermined from the featuring point on the ground plane having no inclination at the still time.

Figure 4:
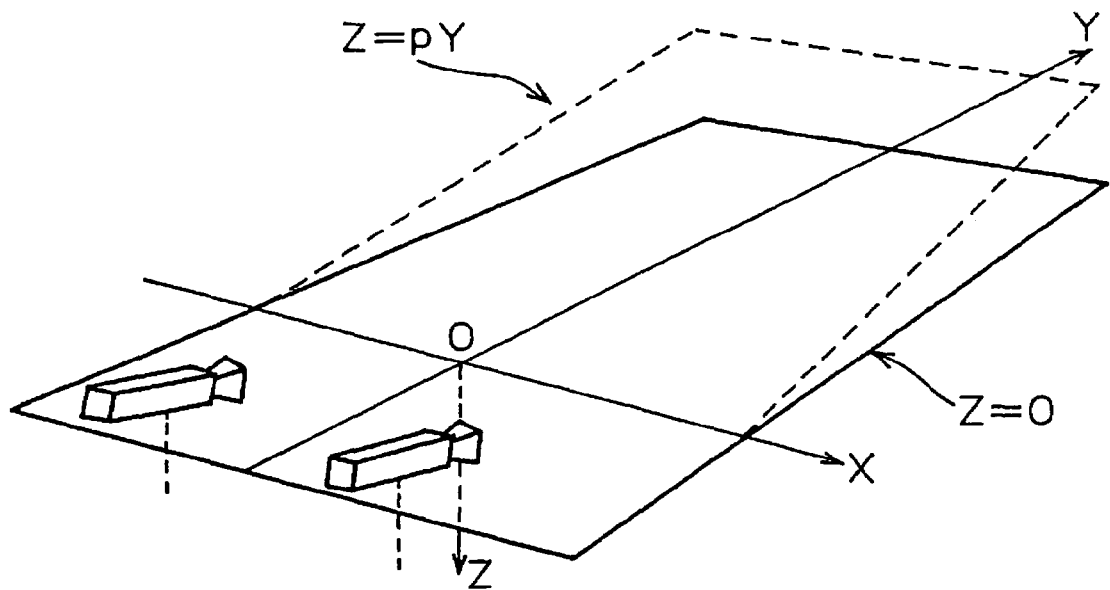
FIG. 4 is a diagram for explaining an inclined plane.

It is assumed (FIG. 4) that the ground plane is changed from the standard plane Z=0 to the inclined plane Z=pY by the change in the inclination of the ground and the vibration of the own vehicle at the traveling time. The inclination in the X-direction can be generally ignored because it is sufficiently smaller than that in the Y-direction. If the line of intersection between the inclined plane and the standard plane is taken on the X-axis, the Formula of the inclined plane can be expressed by Z=pY. Here will be described a method of computing the ground plane constraint with respect to Z=pY from the motions (FIG. 7) of the two white lines. The projected positions (u', v') of the point (X, Y, Z) on the inclined plane on the images are expressed under the aforementioned two premises by substituting Z=pY into Equation (2), as follows:

$$u' = \frac{h_{11}X + (h_{12} + ph_{13})Y + t_1}{(1 + ph_{33})Y + \beta} \quad (10)$$

If it is assumed that the inclination is small, namely, that p is substantially equal to 0, the following Formula is obtained:

$$u' \simeq \frac{h_{11}X + (h_{12} + ph_{13})Y + t_1}{Y + \beta} \quad (11)$$

If Yc=Y+β and if a similar transformation is made for v' by Equation (3), the following Formula is obtained:

$$\begin{bmatrix} u' \\ v' \end{bmatrix} = \begin{bmatrix} h_{11} & t_1 - \beta u'_0 \\ h_{21} & t_2 - \beta v'_0 \end{bmatrix} \begin{bmatrix} X/Y_C \\ 1/Y_C \end{bmatrix} + \begin{bmatrix} u'_0 \\ v'_0 \end{bmatrix} \quad (12)$$

wherein $(u_0', v_0')^T = t'$ indicates the vanishing point of the two white lines.

If:

$$\Delta u = (\Delta u, \Delta v)^T = u - t;$$

and $$\Delta u' = (\Delta u', \Delta v')^T = u' - t',$$

the foregoing Formula is transformed into because Δu=MX from Equation (7):

$$\Delta u' = \begin{bmatrix} h_{11} & t_1 - \beta u_0 \\ h_{21} & t_2 - \beta v_0 \end{bmatrix} X + \beta \begin{bmatrix} 0 & \Delta u_0 \\ 0 & \Delta v_0 \end{bmatrix} X \quad (13)$$

$$= \Delta u + \beta / Y_C \Delta t$$

wherein $$\Delta t = (\Delta u_0, \Delta v_0)^T = t - t'.$$

From the Formula (7), the following Formula is obtained:

$$X = M^{-1} \Delta u \quad (14)$$

and if the following Formula is defined, $1/Y_c = m_{21}\Delta u + m_{22}\Delta v$:

$$M^{-1} = \begin{bmatrix} m_{11} & m_{12} \\ m_{21} & m_{22} \end{bmatrix} \quad (15)$$

Figure 7:
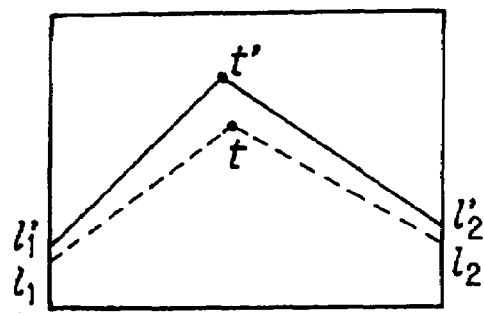
FIG. 7 is a diagram for explaining changes in the two white lines of the two ends of the ground being traveled.

Therefore, Equation (13) is transformed into:

$$\Delta u' = \begin{bmatrix} 1 + \beta_1 \Delta u_0 & \beta_2 \Delta u_0 \\ \beta_1 \Delta v_0 & 1 + \beta_2 \Delta v_0 \end{bmatrix} \Delta u \quad (16)$$

wherein it is assumed that $\beta_1 = m_{21}\beta$ and that $\beta_2 = m_{22}\beta$. If one white line on the images is changed, as shown in FIG. 7, by the inclination from $l_1: \Delta v = p_1 \Delta u$ to $l_1': \Delta v' = p_1' \Delta u'$, the following Formula is obtained from Equation (16):

$$(p_1 \Delta u_0 - \Delta u_0)\beta_1 + p_1(p_1 \Delta u_0 - \Delta u_0)\beta_2 = p_1 - p_1' \quad (17)$$

If a similar transformation is made for the other white line ($l_2 \rightarrow l_2'$), the following Formula is obtained, and there are obtained two one-dimensional equations on $\beta = (\beta_1, \beta_2)^T$:

$$(p_2 \Delta u_0 - \Delta u_0)\beta_1 + p_1(p_2 \Delta u_0 - \Delta u_0)\beta_2 = p_2 - p_2' \quad (18)$$

If the value β is determined from them, a matrix K of Equation (16) can be determined. If the aforementioned processing is made for each of the left and right images, the projected positions of the point on the ground plane are transformed with the change in the inclination into: $\Delta u_l' = K_l \Delta u_l$ and $\Delta u_r' = K_r \Delta u_r$.

By using Equation (9), therefore, the following Formula is obtained:

$$\Delta u_r' = K_r \Delta u_r = K_r A \Delta u_l = K_r A K_l^{-1} \Delta u_l' \quad (19)$$

The value A of Equation (9) has been changed to $A' = K_r A K_l^{-1}$ by the inclination. Equation (19) expresses the ground plane constraint with respect to the inclined plane.

The detection unit 5 detects the obstacle by using the ground plane constraint determined by the parameter computation unit 4. The corresponding point $(u_r, v_r)$ on the right image of the case in which it is assumed that the brightness of an arbitrary point $(u_l, v_l)$ of the left image has an intensity $I_L(u_l, v_l)$ and that the point (u, v) exists on the ground plane is determined from Equation (19) to have an intensity $I_R(u_r, v_r)$. If the point (u, v) is actually present on the ground plane, points P and P' are a set of correct corresponding points so that they basically have an equal intensity.

In short, it is decided that the point P for D of the following Formula is not 0 or for D>Thr (Thr: a preset threshold value) belongs to the obstacle region:

$$D = |I_L(u_l, v_l) - I_R(u_r, v_r)| (|\cdot|: \text{Absolute value}) \quad (20)$$

In these ways, the obstacle on the ground plane can be detected at the traveling time from the stereo cameras mounted on the vehicle.

<Modification 1-1>

In Embodiment 1, the image input unit 1 inputs two images by arranging the two TV cameras transversely, which may be vertically arranged.

On the other hand, there may be arranged three or more cameras.

<Modification 1-2>

The feature extraction unit 3 has been described on the case in which the two lines on the ground plane are to be extracted, but three or more lines may be extracted.

<Modification 1-3>

When it is sufficient to consider only the vibration of the traveling own vehicle, $\beta=0$ (or $\beta_1=\beta_2=0$) may be assumed in Equation (16). The matrix of the righthand side of Equation (16) is K=I (I: the unit matrix), and A'=A in Equation (19). As a result, it is possible to obtain the ground plane constraint more quickly with respect to the inclined plane.

<Modification 1-4>

Figure 8:
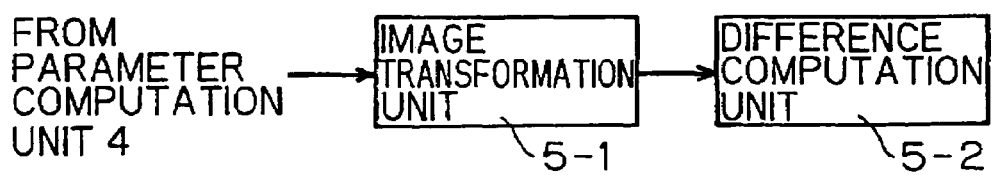
FIG. 8 shows a modification of a detection unit 5.

The detection unit 5 can take a construction shown in FIG. 8. Here, the construction is made of an image transformation unit 5-1 and a difference computation unit 5-2. The image transformation unit 5-1 transforms a right image in accordance with the following procedure. Generally, the image can be expressed as a function f(u, v) which uses the point (u, v) on the image as a variable and which has an intensity defined for each point. In the following, the image is thus expressed.

Figure 9:
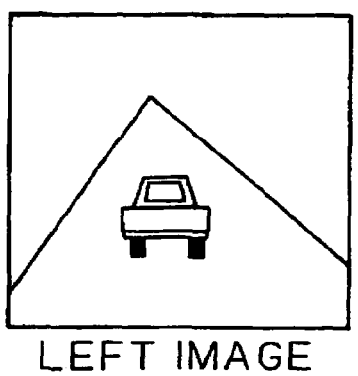
FIG. 9 shows stereo images.
Figure 9:
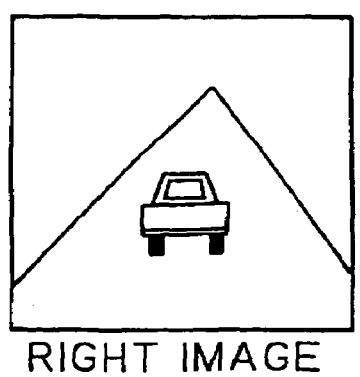

It is assumed that a stereo image shown in FIG. 9 is inputted and that the right image is expressed by g(u, v) and the transformed image is expressed by g' (u, v). This image g' (u, v) is determined in the following manner.

$$g'(u, v) = g(u', v') \quad (21)$$

wherein (u', v') is determined from Equation 19.

Here, the image g' (u, v) is one which is obtained by the left camera when it is assumed that an arbitrary point on the image g(u, v) exists on the ground plane.

Figure 10:
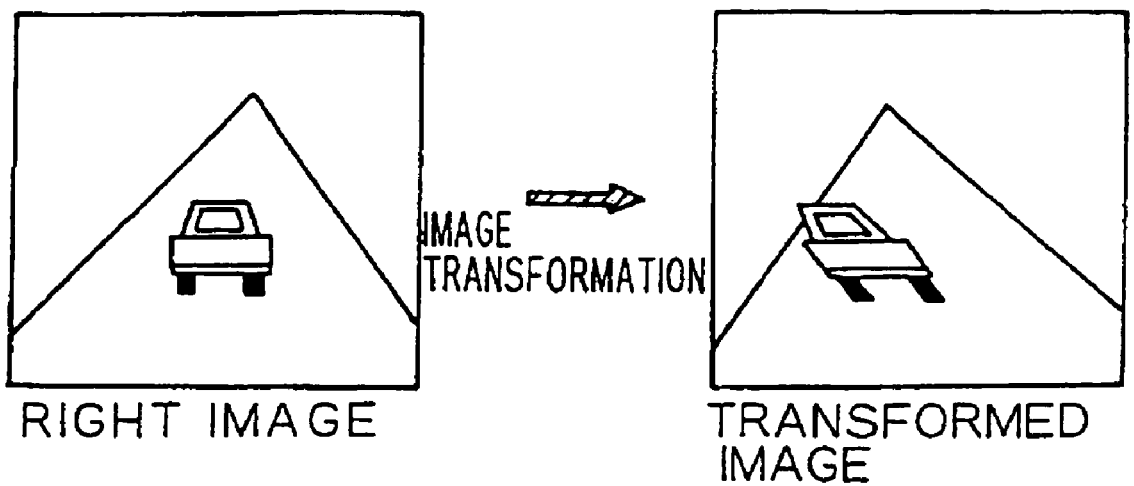
FIG. 10 is a diagram for explaining a right image and its transformed image.
Figure 11:
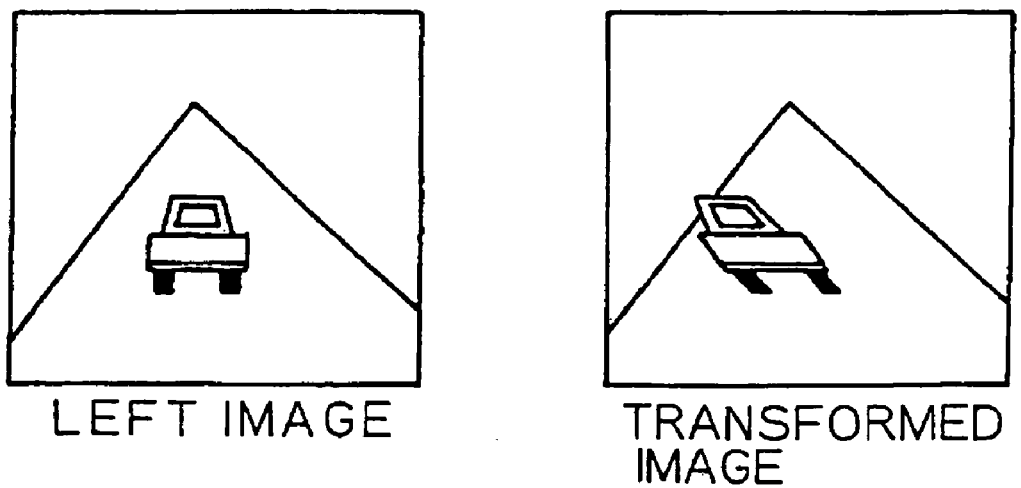
FIG. 11 is a diagram for explaining a left image and the transformed image of the right image.

From the right image of FIG. 10, for example, there is obtained the transformed image, as shown in FIG. 10. As shown in FIG. 11, the projected points of a point on the ground plane are identical between the left image and the trans formed image, but a point non-existing on the ground plane, i.e., a point on the obstacle (i.e., the preceding vehicle in this case) is projected at a location difference according to the height from the ground. Therefore, the obstacle on the ground plane is detected by taking a difference between the left image and the transformed image. Specifically, the left image is expressed by f(u, v), and it is decided that the point P for D' of the following Formula is not 0 or for D'> Thr (Thr: a preset threshold value) belongs to the obstacle region:

$$D' = |f(u,v) - g'(u,v)| \quad (|\cdot|: \text{Absolute value}) \quad (22)$$

<Modification 1-5>

The detection unit 5 detects the difference between the two images by taking the pixel difference, but may detect the difference by setting a window of $(2w+1) \times (2w+1)$ for each point and by computing a normalized cross correlation C of the intensities in the window. The correlation C of the point (u, v) of two images F(u, v) and G(u, v) is expressed by the following Formula:

$$C = \frac{1}{N} \sum_{\eta=-w}^{w} \sum_{\xi=-w}^{w} \frac{(F(u+\xi, v+\eta) - a_1)(G(u+\xi, v+\eta) - a_2)}{\sigma_1 \sigma_2} \quad (23)$$

wherein: $N=(2w+1) \times (2w+1)$; a1 and a2 designate the averages of the intensities in the window of the two images; and $\sigma_1^2$ and $\sigma_2^2$ designate the variances in the intensities in the window of the two images. In this case, it is decided that the point (u, v) for C< Thr (Thr: a present threshold value) belongs to the obstacle region.

<Modification 1-6>

In Embodiment 1, on the other hand, the two white lines on the two ground ends are extracted as the straight lines, but the white lines are curves when the ground is curved. In this case, the obstacle can be likewise detected if the white lines are extracted as the curves.

<Modification 1-7>

The description has been made assuming that the ground plane is flat, but the obstacle can be detected as in the case of the flat plane even for the curved plane.

<Modification 1-8>

Although Embodiment 1 has been described on the obstacle detection from the cameras mounted on the vehicle, it could be applied to the autonomous run of a moving robot, for example, but this method should not be limited to the obstacle detection from the vehicle-mounted cameras.

Embodiment 2

Here, the corresponding point search is not necessary if it is sufficient to separate the ground region and the obstacle region on the images, but the height from the ground plane can be discriminated by the following manner, for example.

Here, the numerals in Equations are independent of those of Embodiment 1 and are newly started from (1).

If the projected points of a point of the ground plane on the left and right images are designated by (u, v) and (u', v'), respectively, the following relation holds:

$$u' = \frac{h_{11}u + h_{12}v + h_{13}}{h_{31}u + h_{32}v + h_{33}}, \quad v' = \frac{h_{21}u + h_{22}v + h_{23}}{h_{31}u + h_{32}v + h_{33}} \quad (1)$$

Vectors $H=(h_{11}, h_{12}, h_{13}, h_{21}, h_{22}, h_{23}, h_{31}, h_{32}, h_{33})$ are parameters depending upon the locations and positions of the individual cameras with respect to the ground plane and upon the focal lengths and image origins of the lenses of the individual cameras. The vectors H are predetermined from the projected points $(u_i, v_i)$ and $(u_i', v_i')$ (i=1, 2, - - -, and N) of four or more points of the ground plane on the left and right images. By using these relations, the corresponding point P'(u', v') on the right image is determined when it is assumed that an arbitrary point P(u, v) on the left image is present on the ground plane.

If the point P is present on the ground plane, the points P and P' make a set of the correct corresponding points so that their intensities are equal. When the points P and P' have different intensities, therefore, it can be decided that the point P belongs to the obstacle region. According to this method, whether an arbitrary point on the image arises from the ground plane can be decided directly only from Equation (1), and the coefficient of Equation (1) can be determined only from the projected points of four or more featuring points of the ground upon the left and right images, thereby to make unnecessary the corresponding point search between the left and right images and the camera calibration using the sample point having a known three-dimensional location.

In the case of traveling at a relatively low speed on the flat floor plane in the indoor circumstance, the vectors h can be deemed as fixed, so that the obstacle can be correctly detected by using the once-determined vectors h.

When the vehicle travels outdoors, however, the relations between the ground plane and the relative locations and positions of the individual cameras are changed time after time by the vibrations of the vehicle itself and by the inclination of the ground.

As a result, the parameter vectors h also change with the movement of the vehicle. If the obstacle is detected either by using the vectors h determined at the still time as they are or with the mere difference from the other camera image, therefore, a pattern on the ground is erroneously detected as the obstacle because of the influences of the errors contained in the parameters, thus causing a problem that the detection accuracy is seriously lowered.

Here will be described one example of the actions of the difference detection unit with reference to FIGS. 12 to 16.

Figure 12:
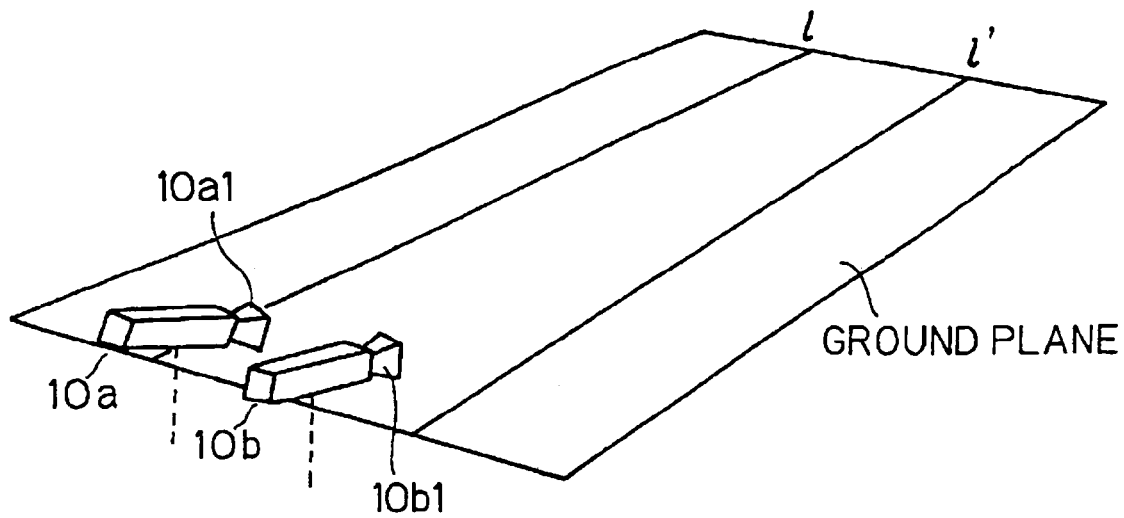
FIG. 12 is a diagram for explaining a positional relation between a ground plane and a stereo camera.

First of all, a vehicle carrying two cameras 10a and 10b having light receiving units 10a1 and 10b1 spaced at a predetermined distance are arranged on a flat ground plane having no inclination, as shown in FIG. 12 presenting a perspective view for explaining the actions. On the ground plane, two white lines are drawn, as designated by 1 and 1', in parallel with each other in the running direction of the vehicle.

It is assumed that the mutual locations and positional relations of those two cameras 10a and 10b are unknown to the obstacle detection system whereas only the epipolar constraint is known, and that the locations, positions and epipolar constraint of the cameras 10a and 10b are invariable during the traveling of the vehicle.

Figure 13:
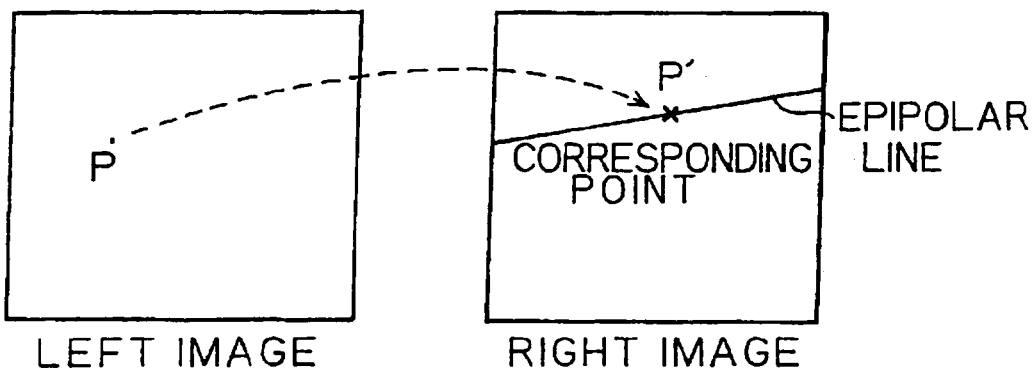
FIG. 13 is a diagram for explaining an epipolar constraint of an obstacle detection system of the invention.

Here, the epipolar constrain holds for the general stereo images and specifies the state in which an arbitrary point P of the (left) image taken by the camera 10a is constrained to exist on a straight line containing a corresponding point P' of the (right) image taken by the camera 10b, as illustrated in FIG. 13 for explaining the epipolar constraint. This straight line is called the "epipolar line".

When the individual cameras are arranged to have their optical axes in parallel, for example, the corresponding point of the arbitrary point P of the left image exists on the same scan-line in the right image so that the epipolar line and the scan-line are aligned with each other. The epipolar constraint depends upon the relative locations and positional relations between the stereo cameras and upon the intrinsic parameters of the individual cameras, i.e., the focal lengths and the principal points of the camera lenses. Therefore, no change in the epipolar constraint means that the relative locational and positional relations and the intrinsic parameters of the stereo cameras do not change during the traveling of the vehicle.

This epipolar constraint is formulated into the following Equation (2):

$$(u, v, 1) F(u, v, 1)^T = 0 \qquad (2)$$

wherein the arbitrary point P of the left image is expressed by (u, v) and the corresponding point of the right image is expressed by (u', v').

The letter F indicates a matrix of 3×3, as called the "fundamental matrix". The Equation (2) is expressed by the following Equation (3) by developing and rearranging it:

$$(F_{11}u + F_{12}v + F_{13})u' + (F_{21}u + F_{22}v + F_{23})v' + (F_{31}u + F_{32}v + F_{33}) = 0 \qquad (3)$$

Equation (3) expresses the epipolar line on the right image, as corresponding to the point (u, v) of the left image. Here, $F_{ji}$ (i, j=1, 2 and 3) designates an element of j-th row and i-th column of the matrix F and is predetermined from a set of corresponding points.

The matrix F is composed of nine elements, which are not independent but can be theoretically determined from seven or more point correspondences. The three-dimensional locations of the set of the individual corresponding points are unnecessary so that the matrix F, i.e., the epipolar constraint can be computed relatively easily.

Figure 14:
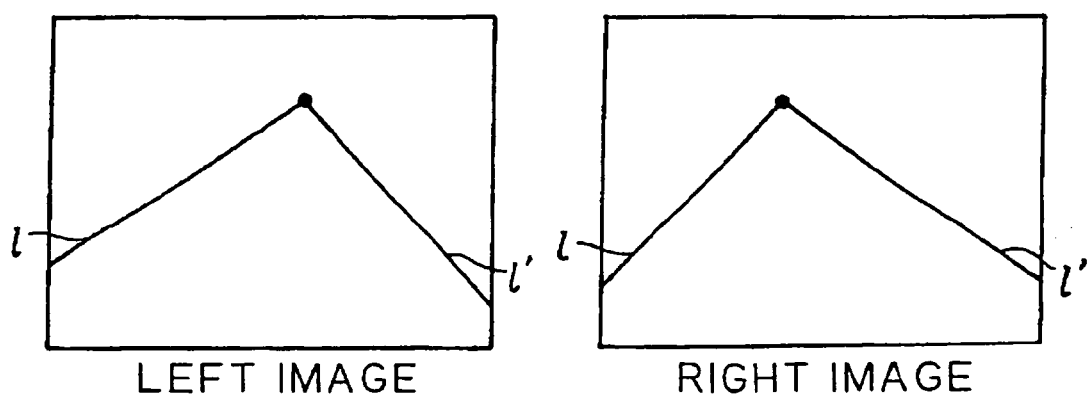
FIG. 14 is a diagram for explaining the actions of a feature extraction unit.

The lines 1 and 1' in the individual images are parallel to each other in the three-dimensional space but intersect in the infinity called the "vanishing point" in the screens, as indicated in the white line regions taken by the individual cameras in FIG. 14.

Figure 15:
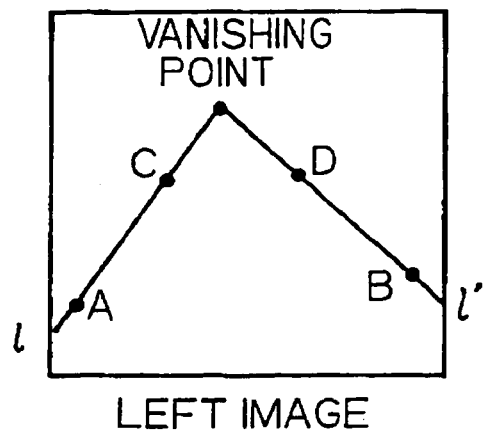
FIG. 15 is a diagram for explaining the actions of a difference detection unit.
Figure 15:
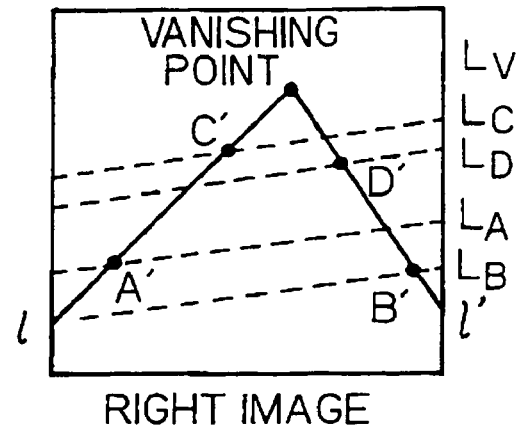
Figure 16A:
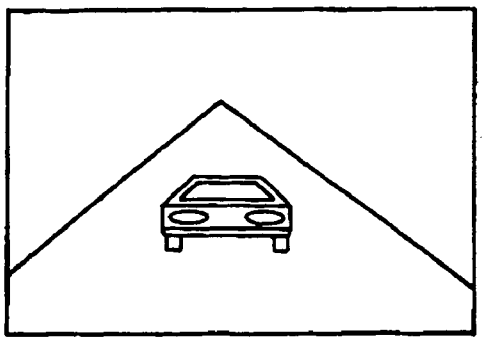
FIG. 16 is another diagram for explaining the actions of the difference detection unit.
Figure 16B:
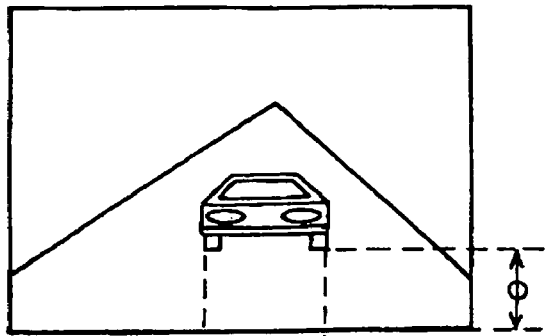
Figure 16C:
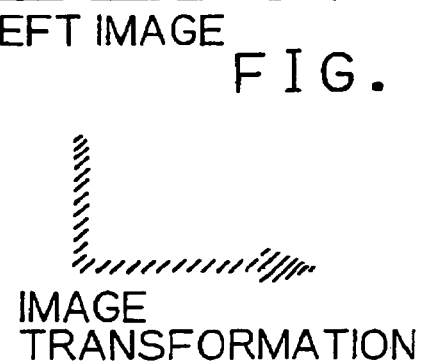
Figure 16C:
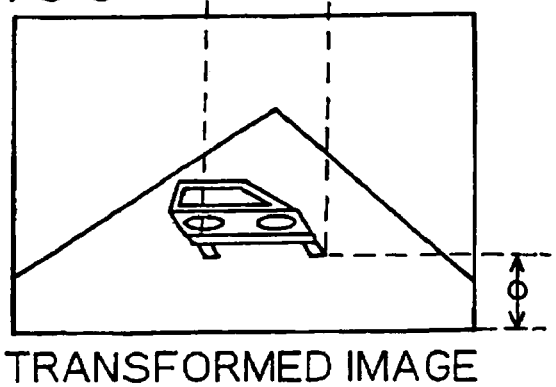

Here will be determined a relation to hold between the corresponding points of the ground plane. As shown in FIG. 15 for explaining the corresponding points, two arbitrary points on the straight line 1 in the left image are designated by A and C, and two arbitrary points on the straight line 1' are designated by B and D.

The corresponding points A', B', C' and D' of those four points on the right image can be easily computed by using the epipolar constraints determined in advance. Specifically, the corresponding point A' of the point A is located at the intersection between the straight line 1 and the epipolar line LA of the point A in the right image. Likewise, the points B', C' and D' can be determined as the intersections of the individual points B, C and D with individual epipolar lines LB, LC and LD.

The points A, B, C and D and their corresponding points A', B', C' and D' are given the coordinates $(u_1, v_1)$, $(u_2, v_2)$, $(u_3, v_3)$ and $(u_4, v_4)$, and $(u_1', v_1')$, $(u_2', v_2')$, $(u_3', v_3')$ and $(u_4', v_4')$ The following relation holds between $(u_i, v_i)$ and $(u_i', v_i')$ (i=1, 2, 3 and 4):

$$u_i' = \frac{h_{11}u_i + h_{12}v_i + h_{13}}{h_{31}u_i + h_{32}v_i + h_{33}}, \quad v_i' = \frac{h_{21}u_i + h_{22}v_i + h_{23}}{h_{31}u_i + h_{32}v_i + h_{33}} \qquad (4)$$

These eight equations are solved for the vector h=($h_{11}$, $h_{12}$, $h_{13}$, $h_{21}$, $h_{22}$, $h_{23}$, $h_{31}$, $h_{32}$ and $h_{33}$). If one arbitrary solution vector h satisfies the foregoing Equation (4), the k-times of the vector h also satisfies the Equation so that no generality is lost even for $h_{33}$=1. From the eight equations, therefore, there can be determined the vector h which is composed of the nine elements.

By using the vector h=($h_{11}$, $h_{12}$, $h_{13}$, $h_{21}$, $h_{22}$, $h_{23}$, $h_{31}$, $h_{32}$ and $h_{33}$) thus determined, the corresponding point P'(u', v') on the right image of the case, in which it is assumed that the arbitrary point P(u, v) of the left image exists on the ground plane, can be determined and expressed by the following Equation (5):

$$u' = \frac{h_{11}u + h_{12}v + h_{13}}{h_{31}u + h_{32}v + h_{33}}, \quad v' = \frac{h_{21}u + h_{22}v + h_{23}}{h_{31}u + h_{32}v + h_{33}} \qquad (5)$$

In the transformation thus made, as in the transformed image example of FIG. 16, the left camera image (a) of the stereo images is transformed into the image shown at (c) when taken in the view point of the right camera. Of the pixels on the ground plane, specifically, the contact points between the tires of the vehicle and the ground plane of FIG. 16 are correctly transformed into the corresponding points, but the object having a spatial height is transformed with a falling distortion in the image.

When the point P(u, v) and the point P'(u', v') have intensities IL(u, v) and IR(u', v'), they make a correct set of corresponding pints if the point P(u, v) actually exists on the ground plane, so that the intensities of the points P and P' basically have the same intensity. If the points P and P' have different intensities, on the contrary, they do not exist on the ground plane.

With a constant relation between the ground plane and the cameras, the following Formula is made:

$$D=|I_L(u,v)-I_R(u',v')| \tag{6}$$

(wherein | | designate an absolute value).

Considering D≠0 or the errors due to the difference between the characteristics of the left and right cameras, the threshold value Thr can be set to decide that the point for D> Thr belongs to the obstacle region.

As a matter of fact, however, various changes such as the vibrations of the cameras and the inclination of the ground plane are caused as the vehicle moves, thereby to make it difficult to discriminate the obstacle from the foregoing Equation (6), as will be reasoned in the following. Because of a large intensity difference between a land mark (such as the "stop" mark or the "speed limit" mark or the white lines) and the ground plane, the Equation (6) is caused to take a large value in the vicinity of the land mark (=the edge peripheries) even in the absence of the obstacle by the displacement between the geometric relation between the assumed ground plane and the camera (i.e., the relation between the camera for determining the aforementioned image transformation parameters and the ground plane) and the geometric relation between the actual ground plane and the camera.

In Embodiment 2, too, it is therefore an object to provide an obstacle detection system capable of stably detecting an obstacle existing on the ground plane.

Embodiment 2-1

Here will be described the construction of Embodiment 2-1 of the invention with reference to the accompanying drawings.

FIGS. 17 to 20 are diagrams showing the obstacle detection system of this Embodiment.

Figure 17:
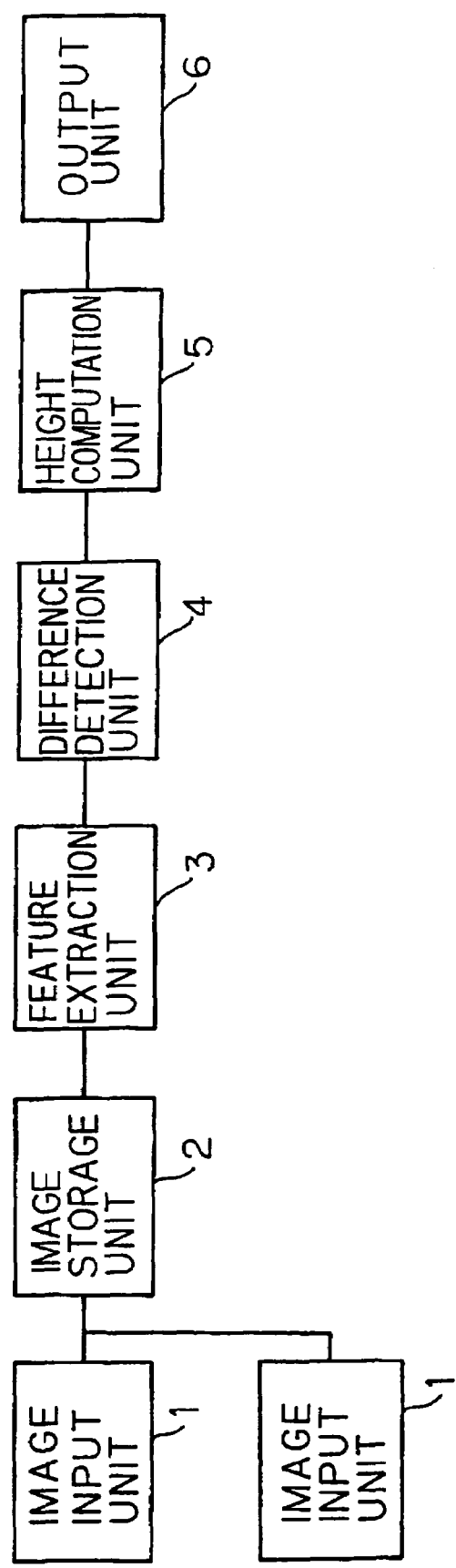
FIG. 17 is a block diagram of Embodiment 2-1 of the obstacle detection system.

FIG. 17 is a block diagram showing the Embodiment of the obstacle detection system. This obstacle detection system is mounted on the driver's own vehicle to be driven by the driver and is constructed to include: image input units 1 and 1 (image pickup units) composed of two stereo cameras having light receiving units 10a1 and 10b1 arranged at a predetermined spacing; an image storage unit 2 for storing the images taken by the image input units 1 and 1; a feature extraction unit 3 for extracting the white line portions from the plurality of images stored in the image storage unit 2; a difference detection unit 4 for detecting whether or not it is the obstacle region; and a height computation unit 5 for computing the height of the obstacle from the detection result of the difference detection unit 4 to detect the true obstacle region.

Here, the detection of an obstacle assumes a situation that a pedestrian, a preceding vehicle or an obstacle to exist on the ground plane is to be detected under the conditions of the vibration to occur when the own vehicle travels and the change in the inclination on the ground plane. It is also assumed that the image taken by the image input unit 1 arranged on the left hand side is a first image or a left camera image whereas the image taken by the image input unit 1 arranged on the righthand side is a second image or a right camera image.

Here will be described the actions of the obstacle detection system thus constructed.

First of all, the region in the traveling direction of the own vehicle is taken simultaneously into to images by using two TV cameras.

Next, the image storage unit 2 stores the two images, as inputted from the image input units 1 and 1, in the image memory.

Next, the feature extraction unit 3 extracts such objects, e.g., two white lines 1 and 1' in the first image and the second image stored in the image storage unit 2 as are disposed on the ground generally in parallel with each other in the region in the traveling direction of the own vehicle, by the edge extracting processing and the Hough transformation. On the other hand, the extracted straight lines 1 and 1' determine the intersection in the screen as the vanishing point. At this vanishing point, the straight lines 1 and 1' intersect in the first image and in the second image.

Next, the difference detection unit 4 reads the left camera image or the first image stored in the image storage unit 2, to determine the transformation parameter by the aforementioned method from the epipolar constraint and the two lines on the ground plane thereby to determined a corresponding region (of one pixel) in the other right camera image with respect to the arbitrary region (of one pixel) in the left camera image taken by one image input unit 1 (e.g., the left stereo camera). At this time, it is assumed that all the points in the left camera image are present on the ground plane. Specifically, the corresponding relation is determined by using the epipolar constraint holding in the stereo images and the two lines extracted at the individual images by the feature extraction unit 3.

Then, this arbitrary region and its corresponding region are compared in their intensities. If the comparison results reveal that the regions have different intensities and that the intensity difference is no less than a standard value set by the user, it is decided that the arbitrary region is the obstacle region, and the obstacle region image is obtained from the result of the computed intensity difference. Here, this obstacle region image is formed by detecting the region (or pixel) having a height from the ground plane.

Next, the height computation unit 5 estimates the height of each region (or pixel) from the ground plane, from the obstacle region image detected by the difference detection unit 4. It is decided by this estimated height whether or not the obstacle distance V between the lower side point Ub and the vanishing line of the ground plane.

When the height of each odstacle detected on the image from the ground plane is computed by using Equation (8) and is smaller than a preset height, i.e., a threshold value γ min, this polygonal region detected is not the true obstacle region but is eliminated as a noise.

Here, the threshold value γ min takes a value to be set by the position where the image input unit 1 is disposed and from the minimum of the height of the obstacle to be detected, and is set as follows when the height H of the image input unit 1 from the ground is 1.5 m and when an obstacle having a height of h =1 m or more is to be detected:

$$\gamma=h/H=1[m]/1.5[m]\approx0.67 \tag{9}$$

Next, the output unit 6 presents the user the information such as the position of the true obstacle detected, in terms of a voice, a light (or image) or a vibration, and transmits the information to the control system for an autonomous traveling.

According to Embodiment 2-1 thus far described, it is possible to correctly detect obstacles on the ground plane in spite of vibrations, road inclination, shadows, road textures, and illumination change.

<Embodiment 2-2>

Here will be described a construction of Embodiment 2-2 region is a true obstacle .

Figure 18:
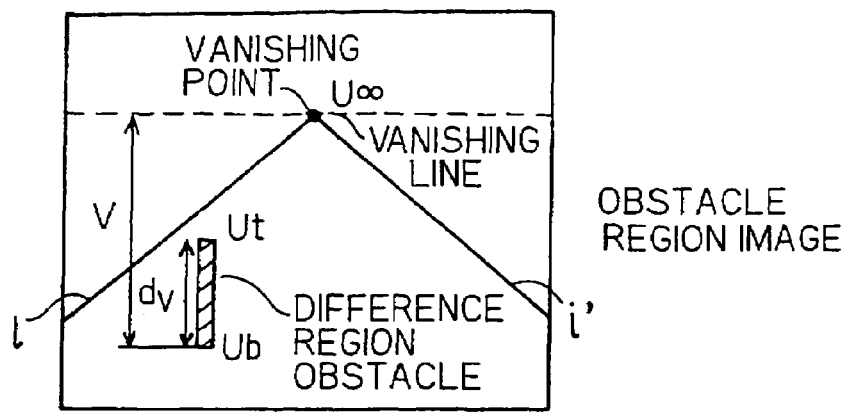
FIG. 18 is another diagram for explaining the actions of a height detection unit of Embodiment 2-1 of the obstacle detection system.

More specific description will be made with reference to FIG. 18 for explaining the actions of the height computation unit 5.

Let it be assumed that there is in the obstacle region image an obstacle region having an intensity difference larger than the standard value set by the user. Here: a point in the lower side of the obstacle region is designated by Ub; a point in the upper side is designated by Ut; and the distance (as taken in the longitudinal direction of the Drawing) between the point Ub and the point Ut is designated by dv. Moreover, the vanishing point at which the straight lines 1 and 1' intersect is designated by U∞, and the distance (as taken in the longitudinal direction of the Drawing) from the point Ub to the vanishing line (i.e., the projected image of the ground plane in the infinite distance) is designated by V. Here, the obstacle region extracted is composed of a plurality of pixels by using one of square pixels dividing the obstacle region image longitudinally and transversely, as the minimum unit.

Here, when the image input unit 1 has a small angle of roll, the vanishing line of the ground plane is substantially aligned with the scan-line which passes through the vanishing point U∞ of the two straight lines 1 and 1'. By the vibration of the image input unit 1 during the traveling of the own vehicle and the change in the inclination of the ground, strictly speaking, the vanishing line of the ground plane moves up and down in the image. However, the rolling of the image input unit 1 is far lower than the pitching, and the transverse inclination of the ground is far smaller than the longitudinal inclination, so that the vanishing line of the ground plane can be approximated by the scanning line passing through the vanishing point U∞ of the two straight lines 1 and 1' even during the traveling of the own vehicle.

Figure 19:
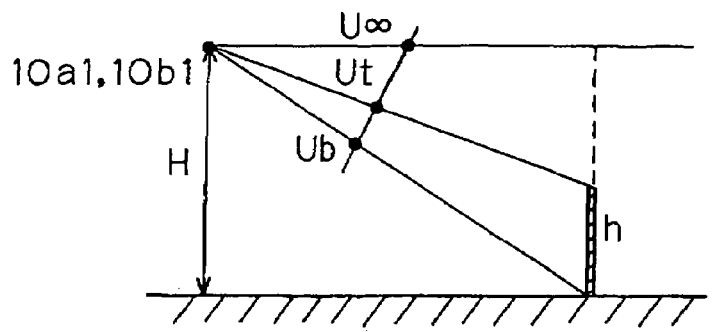
FIG. 19 is a diagram for explaining other actions of the height detection unit of Embodiment 2-1 of the obstacle detection system.

As shown in FIG. 19 for explaining the actions of the difference detection unit 4, on the other hand, the following approximate Equation holds, if the distance (i.e., the height of the image input unit 1 from the ground) in the real space from the ground to the place where the image input unit 1 is disposed is designated by H and if the height of the obstacle (i.e., the height of the obstacle from the ground) is designated by h:

$$h/H \approx dv/V \quad (7).$$

Here, the left hand side of Equation (7) indicates the ratio of the height of the obstacle from the ground to the height of the image input unit 1 from the ground, that is, the relative height. If this ratio is designated by γ, it is expressed as follows:

$$\gamma = dv/V \quad (8).$$

Therefore, the relative height γ can be determined from the longitudinal size dv of the obstacle and the vertical of the obstacle detection system of the invention with reference to FIGS. 20 to 23.

In the following individual Embodiments, the same components as those of Embodiment 2-1 are designated by the same reference numerals so that their repeated description will be omitted.

This Embodiment is characterized: in that the difference detection unit is constructed to include an image transformation unit 4-1 and a difference computation unit 4-2; and in that the left camera image is converted into the image in the view point of the right camera assuming that all image points arise from the ground plane and the obstacle areas are detected comparing the right image to the tranferred one.

Figure 20:
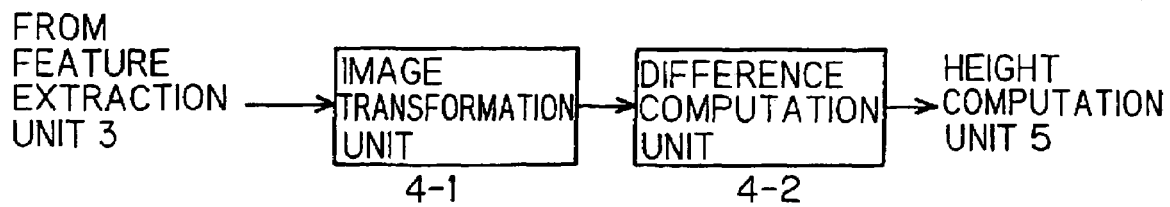
FIG. 20 is a block diagram of Embodiment 2-2 of the obstacle detection system.

FIG. 20 is a block diagram of Embodiment 2-2. The difference detection unit 4 is constructed to include: the image transformation unit 4-1 to which the signal is inputted from the feature detection unit 3; and the difference computation unit 4-2 for outputting the signal to the height computation unit 5. Here, the image input unit 1, the image storage unit 2, the feature extraction unit 3, the height computation unit 5 and the output unit 6 are similar in their constructions and actions to those of Embodiment 2-1.

Figure 21:
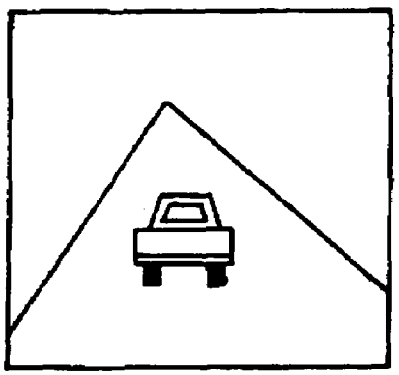
FIG. 21 is a diagram for explaining the actions of a difference detection unit of Embodiment 2-2 of the obstacle detection system.
Figure 21:
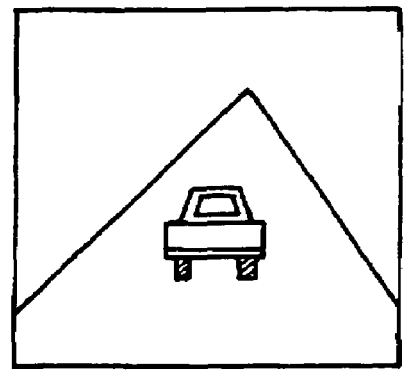

The actions of Embodiment 2-2 thus constructed will be described with reference to FIGS. 21 to 23.

In the following, the description will be made on the case in which the image is transformed from the right camera image, but the transformed image may be likewise obtained from the left camera image.

An arbitrary point (u, v) in the right image is used as a variable, and a function having an intensity defined for each point is expressed by f(u, v).

As shown in FIG. 20 for explaining the actions of Embodiment 2-2, the left image and the right image are inputted by the individual image input units 1.

The right image is expressed by g(u, v), and its transformed image is expressed by g' (u, v). Here can be expressed the following Equation:

$$g'(u, v) = g(u', v') \quad (10).$$

Here, the term (u', v') is determined from Equation (5).

The term g' (u, v) is the left camera image of the case in which an arbitrary point on the right image g(u, v) exists on the ground plane.

Figure 22:
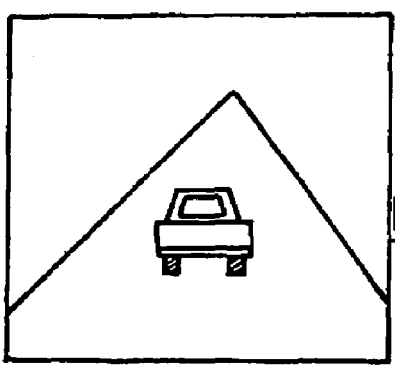
FIG. 22 is a diagram for explaining the difference detection unit of Embodiment 2-2 of the obstacle detection system.
Figure 22:
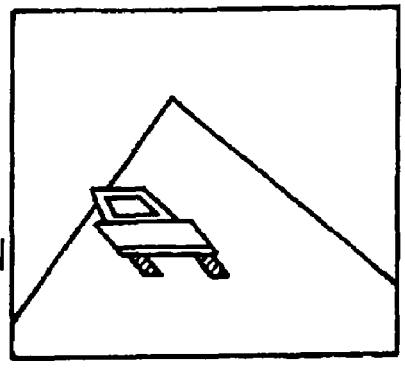

As shown in FIG. 22 for explaining the actions of Embodiment 2-2, for example, if the right camera image is transformed by using the aforementioned Equation, it is possible to obtain the transformed image, as shown on the righthand side of FIG. 22.

Figure 23:
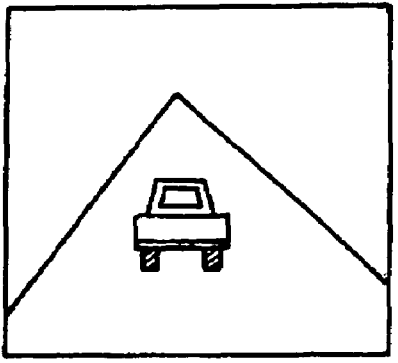
FIG. 23 is a diagram for explaining the difference detection unit of Embodiment 2-2 of the obstacle detection system.
Figure 23:
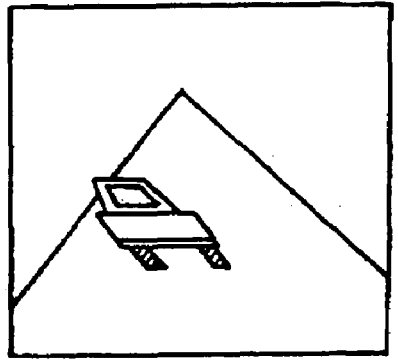

As shown in FIG. 23 for explaining the actions of Embodiment 2-2, on the other hand, the projected point of a point existing on the ground plane is identical in the transformed image to the left camera image. But, a point non-existing on the ground plane, that is, a point of an obstacle (e.g., a preceding vehicle in this case) is projected on a different position according to the height from the ground.

By taking a difference for each corresponding pixel value between the left camera image and the transformed image, therefore, the obstacle on the ground plane is detected.

If the left camera image is expressed by f(u, v), the following expression can be made:

$$D' = |f(u, v) - g'(u, v)| \quad (11).$$

(wherein | | designate an absolute value).

Considering D'≠0 or the errors, it is decided that the point (u, v) for D'> Thr (wherein Thr designates a preset threshold value) belongs to the obstacle region.

On the other hand, the difference detection unit 4 of Embodiment 2-1 has detected the difference between the two images by taking the difference in the pixel value between the corresponding pixels between the individual images, but the difference computation unit 4-2 may detect the difference between the individual images by setting a window of (2w+1)×(2w+1) (wherein w designates a natural number) for each point and by computing a normalized cross correlation C of the intensities in the window.

The correlation C of the point (u, v) of two images F(u, v) and G(u, v) is expressed by the following Formula:

$$C = \frac{1}{N} \sum_{\eta=-w}^{w} \sum_{\xi=-w}^{w} \frac{(F(u+\xi, v+\eta) - a_1)(G(u+\xi, v+\eta) - a_2)}{\sigma_1 \sigma_2} \quad (12)$$

wherein: $N=(2w+1)\times(2w+1)$; a1 and a2 designate the averages of the intensities in the window of the two images; and σ12 and σ22 designate the variances in the intensities in the window of the two images. In this case, it is decided that the point (u, v) for C<Thr belongs to the obstacle region.

The detected obstacle region is sent as the obstacle region image to the height computation unit 5.

In the Embodiment 2-2 thus far described, the difference in the characteristics between the two cameras can be absorbed to detect the true obstacle on the ground plane stably.

Embodiment 2-3

Here will be described Embodiment 2-3 of the obstacle detection system of the invention.

This Embodiment is characterized by making the feature extraction unit unnecessary.

The two TV cameras are fixed in a space other than the own vehicle. Since the TV cameras are not fixed on the moving body such as the own vehicle, the geometric relations between the TV cameras and the ground plane do not change so that the transformation parameters of the point on the ground plane between the stereo images and the location of the vanishing line of the ground plane can be made invariable. For example, the user may mount the TV cameras and may once preset the transformation parameters and the vanishing line of the ground plane.

When the geometric relations between the stereo cameras and the ground plane are thus invariable, the feature extraction unit of Embodiments 2-1 and 2-2 can be made unnecessary.

<Modification 2-1>

Here, the invention should not be limited to the foregoing Embodiments but can naturally be modified in various manners without departing from the gist thereof. For example, the image input units are exemplified by the two TV cameras arranged on the left and right sides. However, the image input units can be arranged at any locations of the rear portion of the own vehicle, for example, or three or more image input units can be arranged, if their light receiving units are spaced from each other and can take the surroundings of the own vehicle simultaneously as the images.

<Modification 2-2>

The feature extraction unit sets the transformation parameters by determining the corresponding relations of the arbitrary four points but can use five sets or more corresponding relations. In this case, ten or more simultaneous equations may be solved by using the least square method.

<Modification 2-3>

The region to be extracted by the feature extraction unit has been described assuming the two white straight lines indicating the lane to be traveled. When the ground is curved, however, the white lines are also curved. In this case, the obstacle can be detected likewise by extracting the white lines as the curves.

<Modification 2-4>

The ground plane is assumed to be flat, but the obstacle can be detected likewise for the flat plane even if the ground plane has a vertical curve.

<Modification 2-5>

An automobile or a motorbike has been assumed as the driver's own vehicle. However, the obstacle detection system can be mounted on an object of an aeroplane or helicopter to detect an obstacle existing on a takeoff or landing place.

<Modification 2-6>

The obstacle detection system has been exemplified by arranging two cameras at a spacing. It is, however, natural that the obstacle detection system is modified to arrange a plurality of light receiving units optically separately but to concentrate the cameras at one place.

Embodiment 3

An obstacle detection system according to Embodiment 3 of the invention is constructed to comprise: a first image pickup unit and a second image pickup unit for obtaining a first image information of a first image and a second image information of a second image, respectively, by taking the surrounding region of a driver's own vehicle substantially simultaneously as images formed of a set of pixels from light receiving units arranged at a spacing on the own vehicle; an image information storage unit for storing the first image information and the second image information; an intensity difference image forming unit for forming an intensity difference image by determining the corresponding pixels in the second image of the second image information, as assuming that an arbitrary pixel of the first image of the first image information stored in the image information storage unit exists on the ground plane being traveled by the own vehicle, to determine the intensity difference between the arbitrary pixel and the corresponding pixel; a discrimination image forming unit for obtaining a discrimination image by discriminating each pixel in the intensity difference image into a pixel having an intensity difference no less than a standard value and a pixel having an intensity difference less than the standard value; and a decision unit for detecting and deciding a region having a generally wedge-shaped set of pixels in the discrimination image as an obstacle region. Here, the image information indicates an image composed of a plurality of pixels, and electric signals transformed from the image.

Here will be described the actions of the aforementioned detection unit with reference to FIGS. 24 to 28.

Here, the numbers of Equations are independent of those of Embodiments 1 and 2 and are newly started from (1).

The actions of the pixel corresponding unit are specified by transforming the first image taken by the first image pickup unit into the image, as seen from the view point of the second image pickup unit, thereby to obtain the transformed image.

Here, the parameters to be used for this transformation are assumed: to be once obtained in advance such that a plurality of image pickup units or cameras and the ground plane being traveled by the driver's own vehicle have a typical geometric relation (for example, when a still vehicle is arranged on the ground plane having no inclination); and to be unchanged during the traveling of the vehicle, i.e., while the actions to detect the obstacle are being made.

Figure 24:
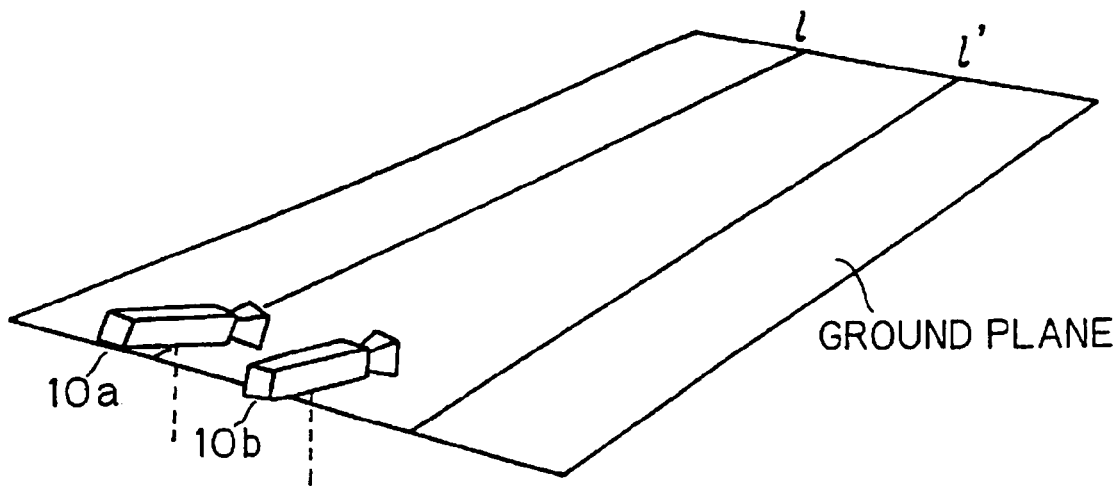
FIG. 24 is a diagram for explaining a positional relation between image pickup means of the obstacle detection system of the invention and the ground plane.

First of all, a vehicle carrying two cameras 10a and 10b are arranged on a flat ground plane having no inclination, as shown in FIG. 24 presenting a perspective view for explaining the actions. On the ground plane, two white lines are drawn, as designated by 1 and 1', in parallel with each other in the running direction of the vehicle.

It is assumed that the mutual locations and positional relations of those two cameras 10a and 10b are unknown to the obstacle detection system whereas only the epipolar constraint is known, and that the locations, positions and epipolar constraint of the cameras 10a and 10b are invariable during the traveling of the vehicle.

Figure 25:
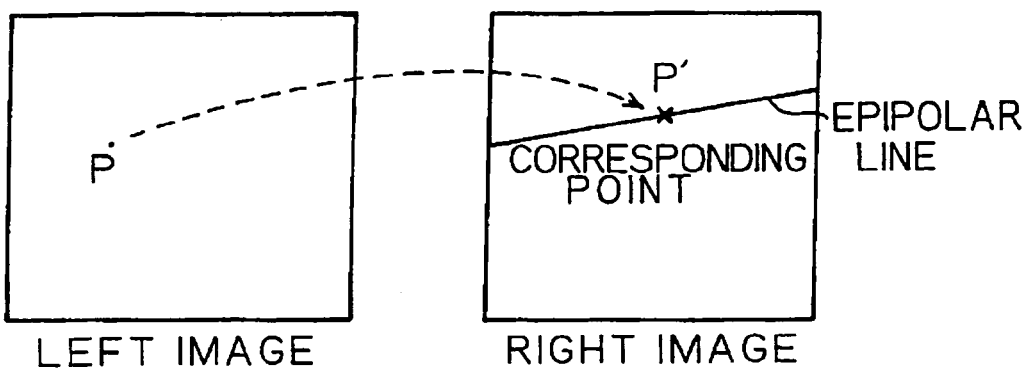
FIG. 25 is a diagram for explaining the epipolar constraint of the obstacle detection system of the invention.

Here, the epipolar constraint holds for the general stereo images and specifies the state in which an arbitrary point P of the (left) image taken by the camera 1a is constrained to exist on a straight line containing a corresponding point P' of the (right) image taken by the camera 10b, as illustrated in FIG. 25 for explaining the epipolar constraint. This straight line is called the "epipolar line".

When the individual cameras are arranged to have their optical axes in parallel, for example, the corresponding point of the arbitrary point P of the left image exists on the same scan-line in the right image so that the epipolar line and the scan-line are aligned with each other. The epipolar constraint depends upon the geometric relationship between the stereo cameras and upon the intrinsic parameters of the individual cameras, i.e., the focal lengths and the principal points. Therefore, no change in the epipolar constraint means that the relative locational and positional relations and the intrinsic parameters of the stereo cameras do not change during the traveling of the vehicle.

This epipolar constraint is formulated into the following Equation (2):

$$(u, v, 1) F (u, v, 1)^T = 0 \quad (2)$$

wherein the arbitrary point P of the left image is expressed by (u, v) and the corresponding point of the right image is expressed by (u', v').

The letter F indicates a matrix of 3×3, as called the "fundamental matrix". The Equation (2) is expressed by the following Equation (3) by developing and rearranging it:

$$(F_{11}u+F_{12}v+F_{13})u'+(F_{21}u+F_{22}v+F_{23})v'+(F_{31}u+F_{33})=0 \quad (3)$$

Equation (3) expresses the epipolar line on the right image, as corresponding to the point (u, v) of the left image. Here, $F_{ji}$ (i, j=1, 2 and 3) designates an element of j-th row and i-th column of the matrix F and is predetermined from a set of a plurality of corresponding points.

The matrix F is composed of nine elements, which are not independent but can be theoretically determined from a set of seven or more corresponding points. The three-dimensional locations of the set of the individual corresponding points are unnecessary so that the matrix F, i.e., the epipolar constraint can be computed relatively easily.

Figure 26:
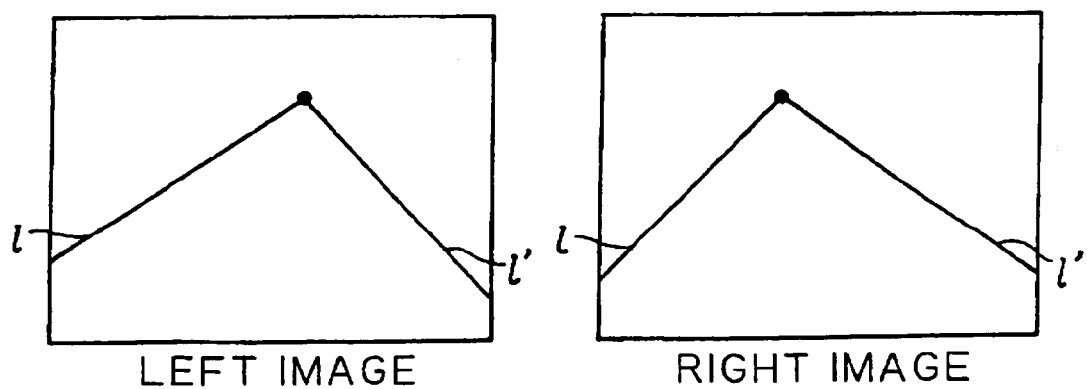
FIG. 26 is a diagram for explaining the epipolar constraint of the obstacle detection system of the invention.

The lines 1 and 1' are parallel to each other in the three-dimensional space but intersect in the so-called "vanishing point" on each image, as indicated in the white line regions taken by the individual cameras in FIG. 26.

Figure 27:
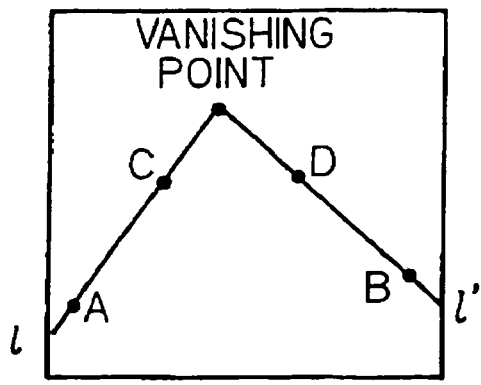
FIG. 27 is a diagram for explaining the epipolar constraint of the obstacle detection system of the invention.
Figure 27:
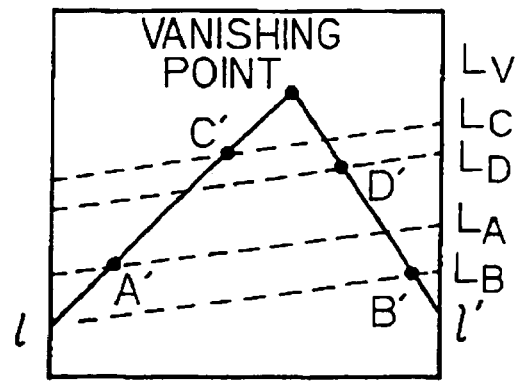

Here will be determined a relation to hold between the corresponding points of the ground plane. As shown in FIG. 27 for explaining the corresponding points, two arbitrary points on the straight line 1 in the left image are designated by A and C, and two arbitrary points on the straight line 1' are designated by B and D.

The corresponding points A', B', C' and D' of those four points on the right image can be easily computed by using the epipolar constraints determined in advance. Specifically, the corresponding point A' of the point A is located at the intersection between the straight line 1 and the epipolar line LA of the point A in the right image. Likewise, the points B', C' and D' can be determined as the intersections of the individual points B, C and D with individual epipolar lines LB, LC and LD.

The points A, B, C and D and their corresponding points A', B', C' and D' are given the coordinates $(u_1, v_1)$, $(u_2, v_2)$, $(u_3, v_3)$ and $(u_4, v_4)$, and $(u_1', v_1')$, $(u_2', v_2')$, $(u_3', v_3')$ and $(u_4', v_4')$. The following relation holds between $(u_i, v_i)$ and $(u_i', v_i')$ (i=1, 2, 3 and 4):

$$u_i' = \frac{h_{11}u_i + h_{12}v_i + h_{13}}{h_{31}u_i + h_{32}v_i + h_{33}}, \quad v_i' = \frac{h_{21}u_i + h_{22}v_i + h_{23}}{h_{31}u_i + h_{32}v_i + h_{33}} \quad (4)$$

These eight equations are solved for the vector h=($h_{11}$, $h_{12}$, $h_{13}$, $h_{21}$, $h_{22}$, $h_{23}$, $h_{31}$, $h_{32}$ and $h_{33}$). If one arbitrary solution vector h satisfies the foregoing Equation (4), the k-times of the vector h also satisfies the Equation so that no generality is lost even for $h_{33}$=1. From the eight equations, therefore, there can be determined the vector h which is composed of the nine elements.

By using the vector h=($h_{11}$, $h_{12}$, $h_{13}$, $h_{21}$, $h_{22}$, $h_{23}$, $h_{31}$, $h_{32}$ and $h_{33}$) thus determined, the corresponding point P'(u', v') on the right image of the case, in which it is assumed that the arbitrary point P(u, v) of the left image exists on the ground plane, can be determined and expressed by the following Equation (5):

$$u' = \frac{h_{11}u + h_{12}v + h_{13}}{h_{31}u + h_{32}v + h_{33}}, \quad v' = \frac{h_{21}u + h_{22}v + h_{23}}{h_{31}u + h_{32}v + h_{33}} \quad (5)$$

Figure 28A:
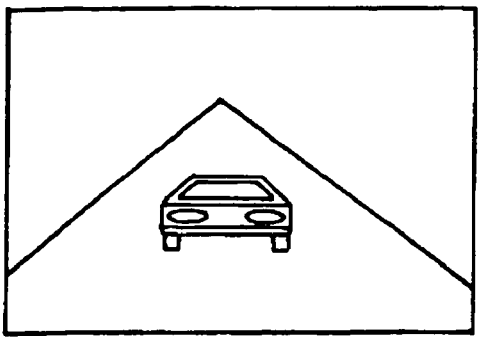
FIG. 28 is a diagram for explaining the actions of an image transformation unit of the obstacle detection system of the invention.
Figure 28B:
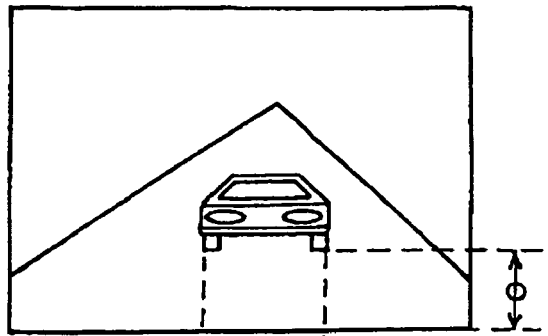
Figure 28C:
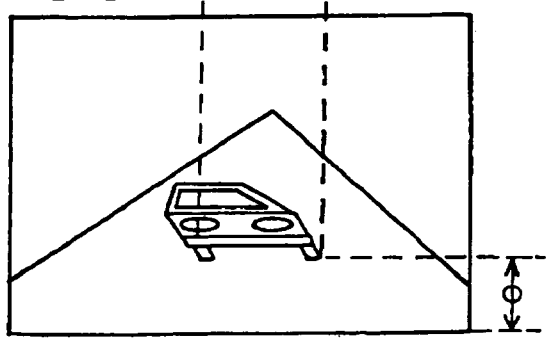

In the transformation thus made, as in the transformed image example of FIG. 28, the left camera image (a) of the stereo images is transformed into the image shown at (c) when taken in the view point of the right camera. Of the pixels on the ground plane, specifically, the contact points between the tires of the vehicle and the ground plane of FIG. 16 are correctly transformed into the corresponding points, but the object having a spatial height is transformed with a falling distortion in the image.

When the point P(u, v) and the point P'(u', v') have intensities $I_L(U, V)$ and $I_R(u', v')$, they make a correct set of corresponding pints if the point P(u, v) actually exists on the ground plane, so that the intensities of the points P and P' basically have the same intensity. If the points P and P' have different intensities, on the contrary, they do not exist on the ground plane.

With a constant relation between the ground plane and the cameras, the following Formula is made:

$$D = |I_L(u,v) - I_R(u',v')| \quad (6)$$

(wherein | | designate an absolute value).

Considering D≠0 or the errors due to the difference between the characteristics of the left and right cameras, the threshold value Thr can be set to decide that the point for D>Thr belongs to the obstacle region.

As a matter of fact, however, various changes such as the vibrations of the cameras and the inclination of the ground plane are caused as the vehicle moves, thereby to make it difficult to discriminate the obstacle from the foregoing Equation (6), as will be reasoned in the following. Because of a large intensity difference between a land mark (such as the "stop" mark or the "speed limit" mark or the white lines) and the ground plane, the Equation (6) is caused to take a large value in the vicinity of the land mark (=the edge peripheries) even in the absence of the obstacle by the difference between the geometric relation between the assumed ground plane and the camera (i.e., the relation between the camera for determining the aforementioned image transformation parameters and the ground plane) and the geometric relation between the actual ground plane and the camera.

Embodiment 3-1

Here will be described the construction of Embodiment 3-1 of the obstacle detection system of the invention with reference to the accompanying drawings.

FIGS. 29 to 33 are diagrams showing the Embodiment 3-1 of the obstacle detection system of the invention.

Figure 29:
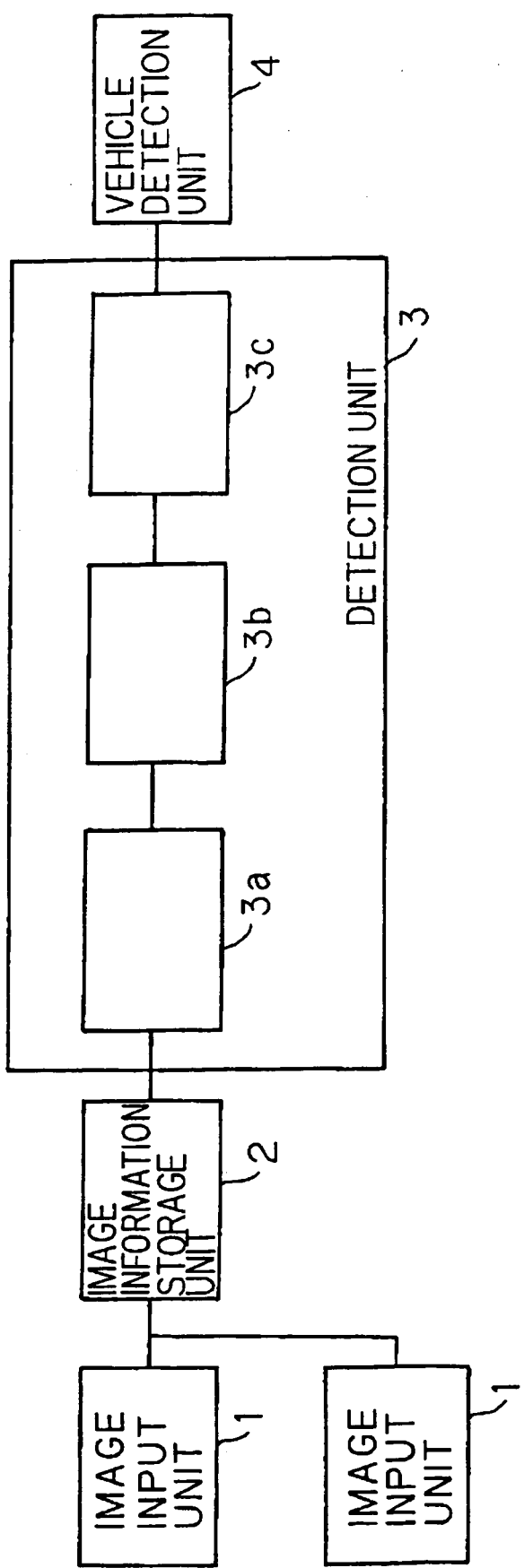
FIG. 29 is a block diagram of Embodiment 3-1 of the obstacle detection system of the invention.

FIG. 29 is a block diagram showing Embodiment 3-1 of the obstacle detection system. This obstacle detection system is mounted on a driver's own vehicle 10 (as should be referred to FIG. 30) to be driven by the driver and is constructed to include: image input units 1 and 1 (image pickup units) composed of two stereo cameras having light receiving units or lenses 1a and 1b arranged at a spacing; an image information storage unit 2 for storing the image informations taken by the image input units 1 and 1; a detection unit 3 for detecting the obstacle from the taken images by processing (as will be detailed) the taken images, to obtain the detected result as the obstacle region image; and a vehicle detection unit having a detection unit for detecting a generally wedge-shaped region from the obstacle region images.

Here, the detection of an obstacle assumes a situation that a pedestrian, a preceding vehicle or an obstacle to exist on the ground plane is to be detected under the conditions of the vibration to occur when the own vehicle travels and the change in the inclination on the ground plane. It is also assumed that the geometrical relation of the two cameras and the construction at the time when the stereo cameras are mounted on the own vehicle are neither changed nor varied from those of the aforementioned time when the image transformation parameters are computed. It is further assumed that the image taken by the image input unit 1 arranged on the lefthand side is a first image or a left camera image whereas the image taken by the image input unit 1 arranged on the righthand side is a second image or a right camera image.

Figure 30:
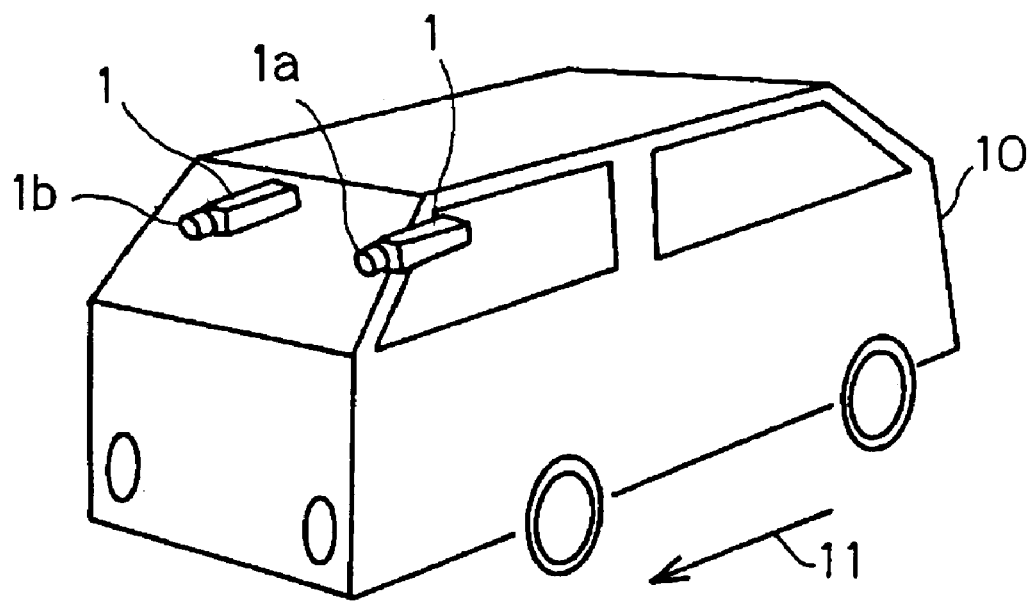
FIG. 30 is a construction diagram of image pickup means of Embodiment 3-1 of the obstacle detection system of the invention.

The locations for mounting the image input units 1 and 1 should not be limited to the ceiling side of the vehicle, but the image input units 1 and 1 may be fixed at any located in the vehicle, as exemplified by the obstacle detection system of Embodiment 3-1 of FIG. 30 if the drive of the user is not troubled and if the running direction (as indicated by an arrow 11) of the own vehicle 10. However, the locations for fixing the image input units 1 and 1 should not change during the traveling of the own vehicle.

Here will be described the actions of the obstacle detection system thus constructed.

First of all, the region in the traveling direction of the own vehicle is taken simultaneously into to images by using two TV cameras.

Next, the image information storage unit 2 stores the two images, as inputted from the image input units 1 and 1, in the image memory.

Figure 31A:
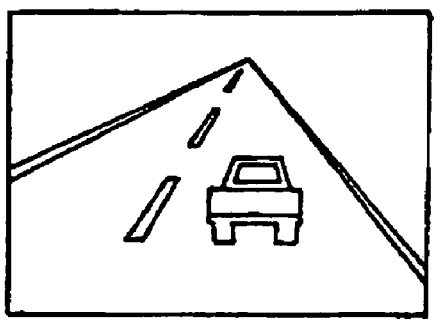
FIG. 31 is a diagram for explaining the actions of a detection unit of Embodiment 3-1 of the obstacle detection system of the invention.
Figure 31B:
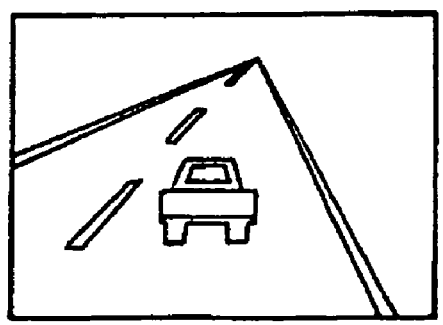
Figure 31C:
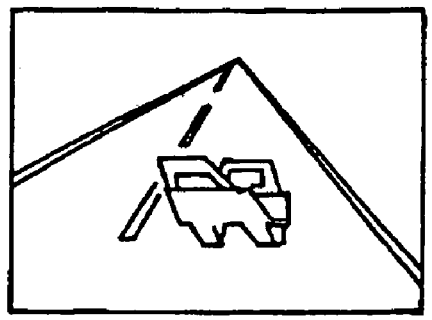
Figure 32:
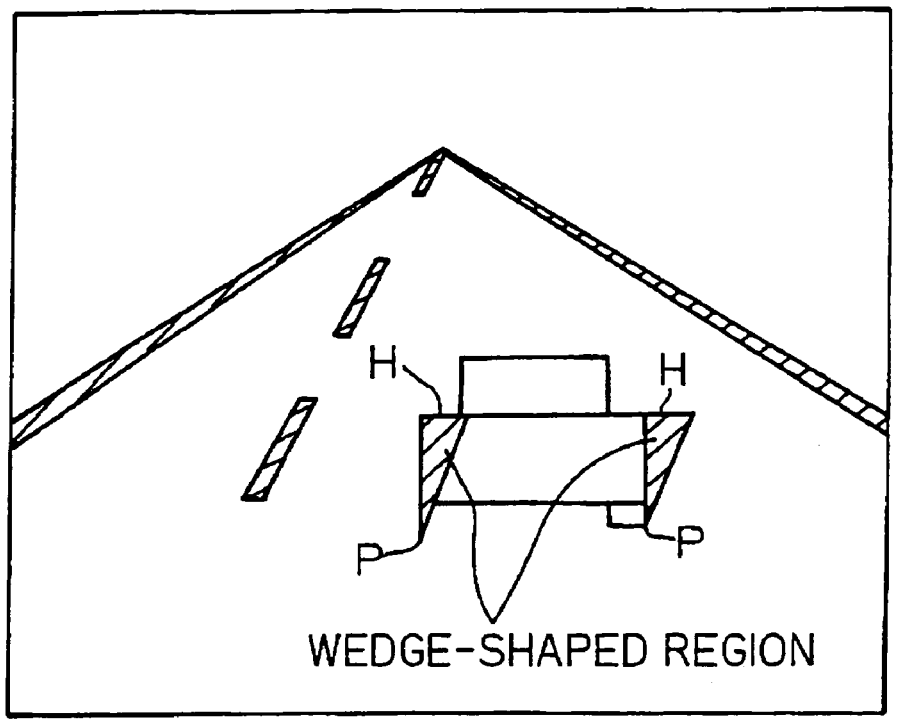
FIG. 32 is a diagram for explaining a decision unit of Embodiment 3-1 of the obstacle detection system of the invention.

Next, in the detection unit 3, as shown in FIG. 31 for explaining the actions of the detection unit of Embodiment 3-1, the pixel corresponding unit 3a reads the left camera image or the first image (or the image information), as stored in the image information storage unit 2, and determines the corresponding pixel in the right camera image corresponding to a predetermined pixel in the left camera image, on the basis of the relation (i.e., the ground plane constraint) holding between the projected locations of an arbitrary pixel on the ground plane predetermined at the still time of the own vehicle, thereby to perform the matching processing (as should be referred to FIG. 31(C)). At this time, assuming that the arbitrary pixel exists on the ground plane in the left camera image, the corresponding pixel in the right camera image is determined. This matching processing is performed for all the pixels that individually construct the left camera image and the right camera image.

The intensity difference image forming unit 3b determines the intensity difference of the corresponding pixel, as corresponding to the pixel in the left camera image, of the right camera image.

The discrimination image forming unit 3c discriminates whether the intensity difference of each pixel in the intensity difference image is no less or less than the standard value preset by the user. As a result of this discrimination, the pixel having an intensity no less than the standard value belongs to the obstacle region, and the pixel having an intensity no more than the standard value belongs not to the obstacle region but to the ground plane, thereby to divide the obstacle region and the non-obstacle region such as the ground plane. Here, the intensity difference of each corresponding pixel, as obtained from the left camera image and the right camera image, is obtained as the discrimination image.

Next, the vehicle detection unit 5 detects the region, in which the set of pixels has a general wedge shape, from the discrimination image, and decides the detected region as the obstacle region. The reason why the region for detecting obstacle is formed into the general wedge shape is empirical but is that when the left camera image is transformed into the right camera view point, the intensity of the pixel in the region having an increasing height on the side of the vehicle is not equalized but formed into the general wedge shape. On the other hand, this wedge shape is intensified on the two ends of the obstacle in the transverse direction of the image.

Figure 33:
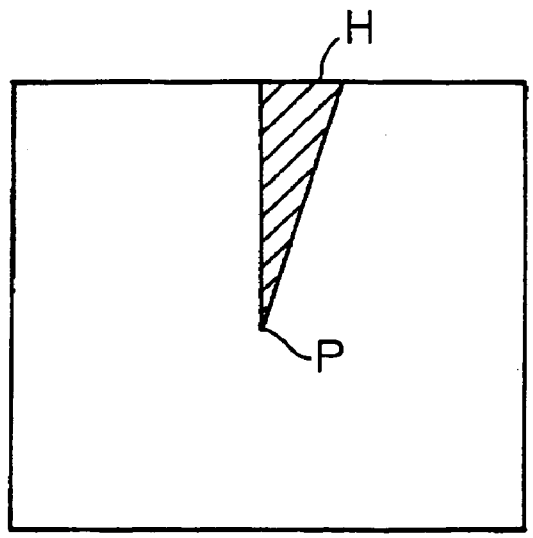
FIG. 33 is a diagram for explaining of the decision unit of Embodiment 3-1 of the obstacle detection system of the invention.

The region of the general wedge shape is detected from the discrimination image by scanning the wedge-shaped template stored in the vehicle detection unit 5, as shown in FIG. 33, in the raster direction of the discrimination image to perform the template matching. In this template matching, the size of the temperature used is smaller than the obstacle region to be detected.

Here, the wedge-shaped region and the template are so arranged that the locational relation between a side H existing generally in the scan-line direction of the left camera image (or the right camera image) and an apex P opposed to the side H has the side H at an upper location of the image.

The lower location of the image of the general wedge shape in the discrimination image, as detected by the vehicle detection unit 5, that is, the location of the apex P is at the contact between the obstacle region in the traveling direction of the own vehicle and the ground being traveled by the own vehicle, or at a portion of the obstacle region the closest to the own vehicle.

On the other hand, the generally wedge-shaped region detected by the vehicle detection unit 5 exists in one pair in the generally identical shape at a spacing on the generally common scan-line so that the region defined by these paired generally wedge-shaped regions is decided to be the obstacle region.

On the other hand, the obstacle information, as detected by the vehicle detection unit 5, can be suitably provided for the user by the audio means such as voices, the visual means such as lights (including the images), or the bodily sensation means such as vibrations.

According to Embodiment 3-1 thus far described, no matter what ground the own vehicle might travel, the obstacle can be stably detected without being influenced by the fluctuation of the brightness or the shadow of the preceding vehicle while suppressing the influences of the vibration and the inclination of the ground itself. By warning the presence of the obstacle to the user, on the other hand, it is possible to avoid the event which may occur in the presence of the obstacle, as the user desires so.

Embodiment 3-2

Here will be described a construction of Embodiment 3-2 of the obstacle detection system of the invention with reference to FIGS. 34 to 37.

In the following Embodiment 3-2, the same components as those of Embodiment 3-1 are designated by the same reference numerals so that their repeated description will be omitted.

This Embodiment 3-1 is characterized: in that the detection unit is constructed to include an image trans formation unit 3-1 and a difference computation unit 3-2; and in that the left camera image is converted into the image in the view point of the right camera so that the obstacle is detected by comparing an arbitrary region of the transformed image and the corresponding region, as corresponding to the arbitrary region, of the right camera image.

Figure 34:
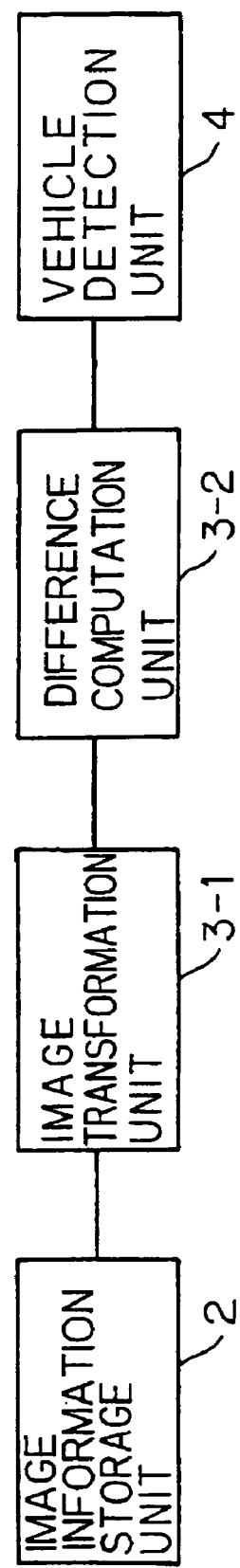
FIG. 34 is a block diagram of Embodiment 3-2 of the obstacle detection system of the invention.

FIG. 34 is a block diagram of Embodiment 3-2. The detection unit 3 is constructed to include: the image transformation unit 3-1 to which the signal is inputted from the image information storage unit 2; and the difference computation unit 3-2 for outputting the signal to the vehicle detection unit 4. Here, the image input unit 1, the image information storage unit 2 and the vehicle detection unit 4 are similar in their constructions and actions to those of Embodiment 3-1.

Figure 35:
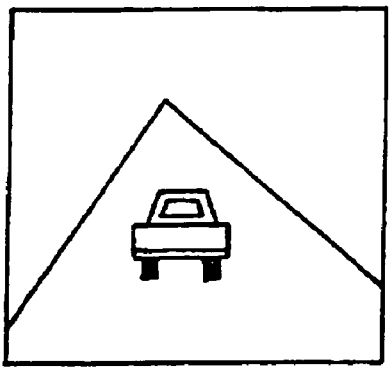
FIG. 35 is a diagram for explaining the actions of a detection unit of Embodiment 3-2 of the obstacle detection system of the invention.
Figure 35:
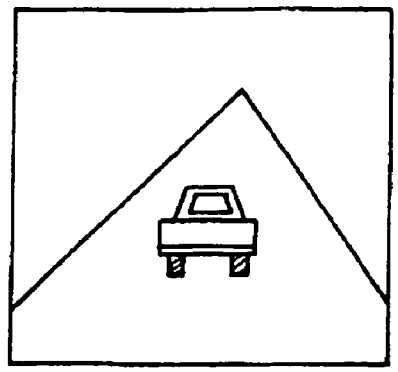

The actions of Embodiment 3-2 thus constructed will be described with reference to FIGS. 35 to 37.

In the following, the description will be made on the case in which the image is transformed from the right camera image, but the transformed image may be likewise obtained from the left camera image.

An arbitrary point (u, v) in the right image is used as a variable, and a function having an intensity defined for each point is expressed by f(u, v).

As shown in FIG. 34 for explaining the actions of Embodiment 3-2, the left image and the right image are inputted by the individual image input units 1.

The right image is expressed by g(u, v), and its trans formed image is expressed by g'(u, v). The following Equation is determined from Equation (5):

$$g'(u, v) = g(u', v') \quad (10).$$

The term g'(u, v) is the left camera image of the case in which an arbitrary point on the right image g(u, v) exists on the ground plane.

Figure 36:
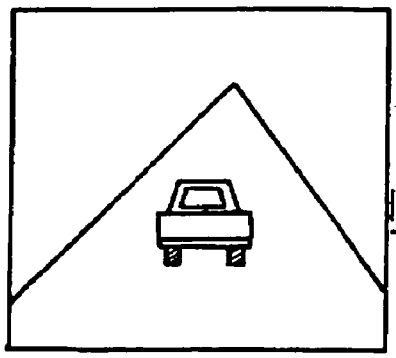
FIG. 36 is a diagram for explaining the actions of a detection unit of Embodiment 3-2 of the obstacle detection system of the invention.
Figure 36:
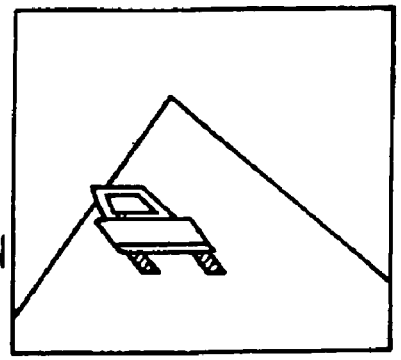

As shown in FIG. 36 for explaining the actions of Embodiment 3-2, for example, if the right camera image is transformed by using the aforementioned Equation, it is possible to obtain the transformed image, as shown on the righthand side of FIG. 36.

Figure 37:
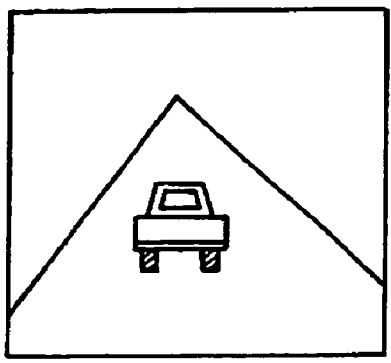
FIG. 37 is a diagram for explaining the actions of a detection unit of Embodiment 3-2 of the obstacle detection system of the invention.
Figure 37:
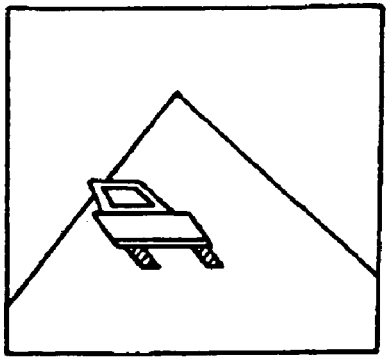
Figure 38:
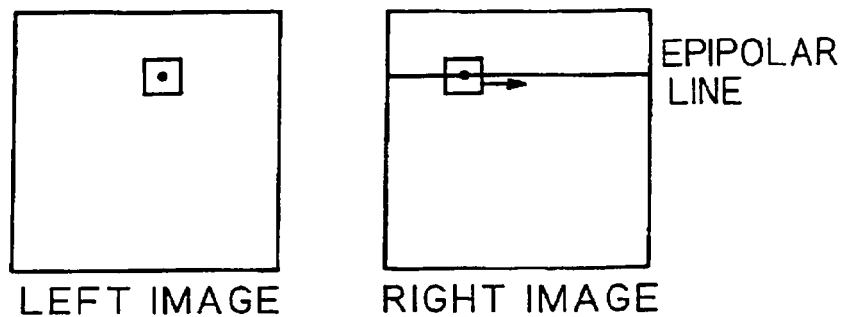
FIG. 38 is a diagram for explaining a corresponding search of stereoscopic views.

As shown in FIG. 37 for explaining the actions of Embodiment 3-2, on the other hand, the projected point of a point existing on the ground plane is identical in the transformed image to the left camera image. But, a point non-existing on the ground plane, that is, a point of an obstacle (e.g., a preceding vehicle in this case) is projected on a different position according to the height from the ground.

By taking a difference for each corresponding pixel value between the left camera image and the transformed image, therefore, the obstacle on the ground plane is detected. If the left camera image is expressed by f(u, v), the following expression can be made:

$$D' = |f(u, v) - g'(u, v)| \quad (11).$$

(wherein | | designate an absolute value).

Considering D'≠0 or the errors, it is decided that the point (u, v) for D'>Thr (wherein Thr designates a preset threshold value) belongs to the obstacle region.

On the other hand, the detection unit 4 of Embodiment 3-1 has detected the difference between the two images by taking the difference in the pixel value between the corresponding pixels between the individual images, but the difference computation unit 3-2 may detect the difference between the individual images by setting a window of (2w+1)×(2w+1) (wherein w designates a natural number) for each point and by computing a normalized cross correlation C of the intensities in the window.

The correlation C of the point (u, v) of two images F(u, v) and G(u, v) is expressed by the following Formula:

$$C = \frac{1}{N} \sum_{\eta=-w}^{w} \sum_{\xi=-w}^{w} \frac{(F(u+\xi, v+\eta) - a_1)(G(u+\xi, v+\eta) - a_2)}{\sigma_1 \sigma_2} \quad (12)$$

wherein: $N = (2w+1) \times (2w+1)$; $a_1$ and $a_2$ designate the averages of the intensities in the window of the two images; and $\sigma_1^2$ and $\sigma_2^2$ designate the variances in the intensities in the window of the two images. In this case, it is decided that the point (u, v) for C<Thr belongs to the obstacle region.

The detected obstacle region is sent as the obstacle region image to the vehicle detection unit 5.

According to Embodiment 2-1 thus far described, it is possible to correctly detect obstacles on the ground plane in spite of vibrations, road inclination, shadows, road textures, and illumination change.

<Modification 3-1>

Here, the invention should not be limited to the foregoing Embodiments but can naturally be modified in various manners without departing from the gist thereof.

For example, the image input units are exemplified by the two TV cameras, but the image input units can be arranged at any locations, or three or more image input units can be arranged, if their light receiving units are arranged to have parallel optical axes and spaced from each other and can take the forward regions of the own vehicle simultaneously as the images.

<Modification 3-2>

The feature extraction unit sets the transformation parameters by determining the corresponding relations of the arbitrary four sets of points but can use five sets or more corresponding relations. In this case, ten or more simultaneous equations may be solved by using the method of least squares.

<Modification 3-3>

The ground plane is assumed to be flat, but the obstacle can be detected likewise for the flat plane even if the ground plane has a vertical curve with respect to the ground surface.

<Modification 3-4>

An automobile or a motorbike has been assumed as the driver's own vehicle. However, the obstacle detection system can be mounted on an object of an aeroplane or helicopter to detect an obstacle existing on a takeoff or landing place.

<Modification 3-5>

The obstacle detection system has been exemplified by arranging two cameras at a spacing. It is, however, natural that the obstacle detection system is modified to arrange a plurality of light receiving units optically separately but to concentrate the cameras at one place.

<Modification 3-6>

The ground plane has been described assuming it to be fat. Even if the ground plane is assumed to be curved, however, the obstacle can be detected, for example, by approximating the curve into a plurality of sectional planes, by preparing a plurality of image transformation parameters and by performing the image transformation sectionally on the image.

Embodiment 4

Here will be described Embodiment 4 of the invention with reference to FIGS. 39 to 49.

Here, the numbers of Equations are independent of those of Embodiments 1, 2 and 3 and are newly started from (1).

Figure 39:
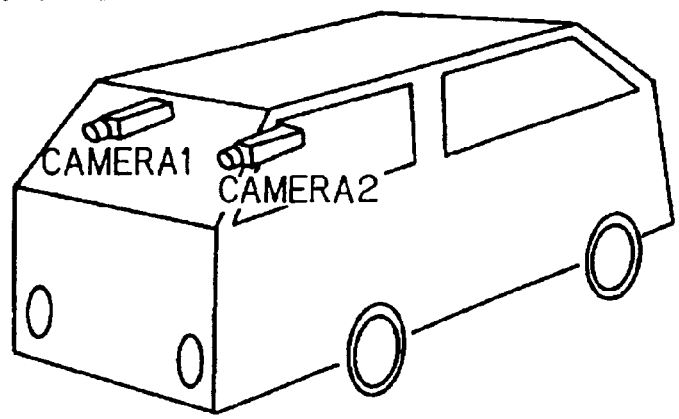
FIG. 39 is a diagram for explaining of a driver's own vehicle of Embodiment 4.

In Embodiment 4, there are imagined situations that an obstacle existing on a ground plane such as a pedestrian, a preceding vehicle or a parked vehicle is detected by two left and right stereo cameras mounted on a vehicle (as will be called the "own vehicle"), as shown in FIG. 39, and that the time for the obstacle to contact with the own vehicle is computed.

Figure 40:
FIG. 40 is a block diagram of the obstacle detection system of Embodiment 4.

FIG. 40 shows a schematic construction of the obstacle detection system according to Embodiment 4. This obstacle detection system is constructed to include an image input unit 1, an image storage unit 2, a feature extraction unit 3, a detection unit 4 and a contact time computation unit 5.

In the obstacle detection system, a stereo images are obtained by two cameras, the mutual locations/positions and the focal lengths/principal points of the lenses are unknown, and an equation (as will be called the "ground plane constraint") expressing a relation to hold between the projected positions of a point of the ground plane, as determined at a still time, upon the projected locations is used to discriminate whether or not each point on the image has a height from the ground plane, thereby to separate the obstacle region and the ground region. Moreover, the time for the obstacle to contact with the own vehicle is computed from the locus of the obstacle on the image.

Figure 41:
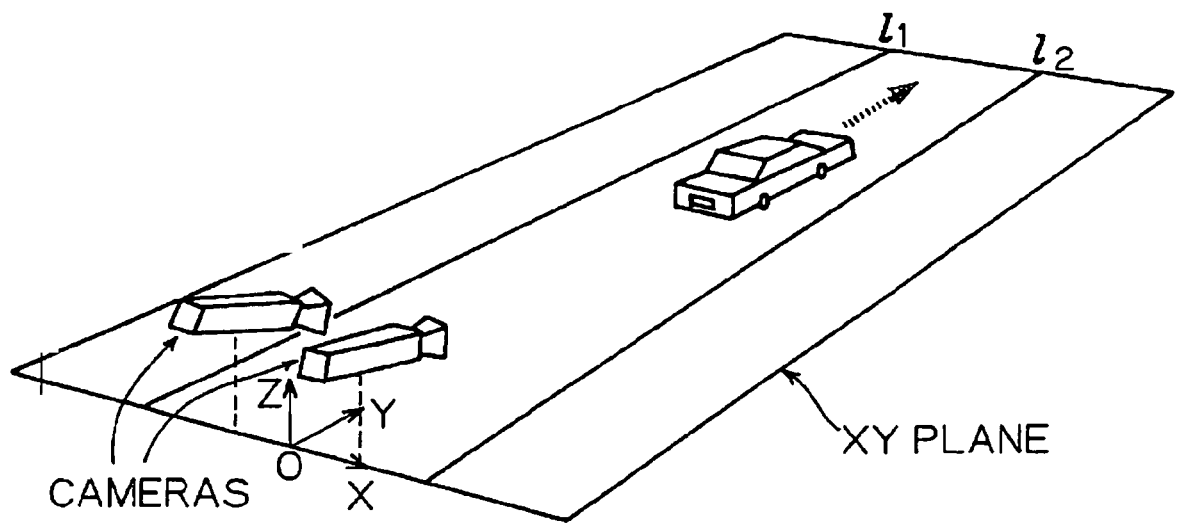
FIG. 41 is a diagram for explaining the own coordinate system.

FIG. 41 shows a coordinate system of the own vehicle.

In the own vehicle coordinate system: the advancing (or longitudinal) direction of the own vehicle is taken in the Y-axis; the transverse and vertical directions are taken in the X-axis and the Z-axis, respectively; and the ground plane is taken in the X-Y plane. In Embodiment 4, it is premised that both the own vehicle and the obstacle travel along the two white lines (or straight lines l and l') on the two road ends.

(Image Input Unit 1)

The image input unit 1 takes two images by using two left and right TV cameras. The locations and positions of those two cameras with respect to the own vehicle coordinate system and the focal lengths and the principal points of the lenses of the individual cameras may be unknown, but it is assumed in Embodiment 4 that the individual cameras are fixed on the vehicle and not changed during the traveling.

(Image Storage Unit 2)

The image storage unit 2 stores an image memory with the two images inputted from the image input unit 1.

(Feature Extraction Unit 3)

Figure 42:
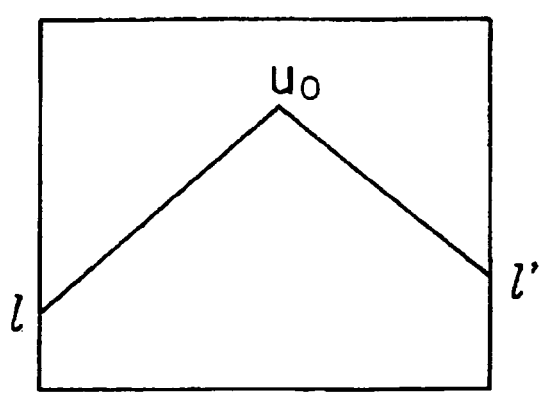
FIG. 42 is a diagram for explaining a linear extraction processing in the feature extraction unit 3.

The feature extraction unit 3 detects the two straight lines 11 and 12, as shown in FIG. 42, by using one of the two images stored in the image storage unit 2, as a standard image (which will be exemplified by the left image in the following).

The point of intersection (or the projected point of the infinite points of the two straight lines upon the images, as will be called the "vanishing point") is expressed by u0(u0, v0). This straight line detection is performed by using the edge extraction processing and the Hough transformation.

(Detection Unit 4)

The detection unit 4 detects the obstacle by using the constraint (as will be called the "ground plane constraint") to hold between the projected points of the point of the ground plane upon the left and right images. Here will be described this ground plane constraint.

If the projected points of an arbitrary point (X, Y) of the ground plane (or the X-Y plane) upon the left and right images are designated by (u, v) and (ur, vr), the following relation generally holds:

$$u = \frac{h_{11}X + h_{12}Y + t_1}{h_{31}X + h_{32}Y + t_3}, \quad v = \frac{h_{21}X + h_{22}Y + t_2}{h_{31}X + h_{32}Y + t_3} \quad (1)$$

$$u_r = \frac{h'_{11}X + h'_{12}Y + t'_1}{h'_{31}X + h'_{32}Y + t'_3}, \quad v_r = \frac{h'_{21}X + h'_{22}Y + t'_1}{h'_{31}X + h'_{32}Y + t'_3} \quad (2)$$

wherein $h = (h_{11}, h_{12}, \text{---}, \text{and } t_3)^T$ and $h' = (h'_{11}, h'_{12}, \text{---}, \text{and } t'_3)^T$ are parameters relating to the three-dimensional locations and positions of the individual cameras with respect to the own vehicle coordinate system, and the focal lengths and the principal points of the lenses mounted on the individual cameras.

If X and Y are eliminated from Equations (1) and (2), the following Formula is obtained:

$$u_r = \frac{H_{11}u + H_{12}v + H_{13}}{H_{31}u + H_{32}v + H_{33}}, \quad v_r = \frac{H_{21}u + H_{22}v + H_{13}}{H_{31}u + H_{32}v + H_{33}} \quad (3)$$

wherein $H = (H_{11}, H_{12}, \text{---}, \text{and } H_{33})^T$ are constants expressed by h and h'.

From this Formula, there can be determined the corresponding point on the right image when the point (u, v) on the left image is assumed to be on the ground plane.

In other words, assuming that the point (u, v) on the left image is on the ground plane, the corresponding point (u$_r$, $v_r$) on the right image is determined by the aforementioned Equation. This Equation will be called the "ground plane constraint".

Here, the parameters $H=(H_{11}, H_{12}, ---, \text{ and } H_{33})^T$ are predetermined at the still time.

Here will be described this method.

First of all, an $N(\geq 4)$ number of featuring points (e.g., the intersection point of the straight lines drawn on the ground plane or the corner points of paint) on the ground plane are extracted from the left image.

Next, there are determined the corresponding points of the individual extracted featuring points on the right image. Here, these featuring point extractions and the correspondences may also be performed by pointing the points on the images with the mouse. These N sets of corresponding relations satisfy the Equation (3) individually so that a 2N number of simultaneous equations are obtained.

The parameter H can be determined by solving those simultaneous equations for H.

Here will be described the method for detecting the obstacle by using the ground plane constraint.

The corresponding point A' $(u_r, v_r)$ on the right image of the case in which it is assumed that the brightness of an arbitrary point A(u, v) of the left image has an intensity $I_L(u, v)$ and that the point A exists on the ground plane is determined from Equation (3) to have an intensity $I_R(u_r, v_r)$.

If the point (u, v) is actually present on the ground plane, the points A and A' make a set of correct corresponding points (that is, the points A and A' are the projected points of the same point of the ground plane) so that the point A and the point A' basically have an equal intensity. For the following Formula, therefore, Diff=0:

$$\text{Diff}=|I_L(u, v)-I_R(u_r, v_r)| \quad (|\cdot|: \text{Absolute value}) \quad (4)$$

Unless Diff=0, on the contrary, the point A(u, V) and the point A'$(u_r,v_r)$ do not belong to the set of correct correcting points, so that the point (u, v) is not present on the ground plane, i.e., the point on the obstacle.

After these series of processing were performed on all the points of the standard image, it is possible to detect the obstacle region.

At this time, considering an error of some extent as the standard for deciding the obstacle, it may be decided that a point for Diff>Thr belongs to the obstacle region.

Here, Thr designate a preset threshold value.

Figure 43:
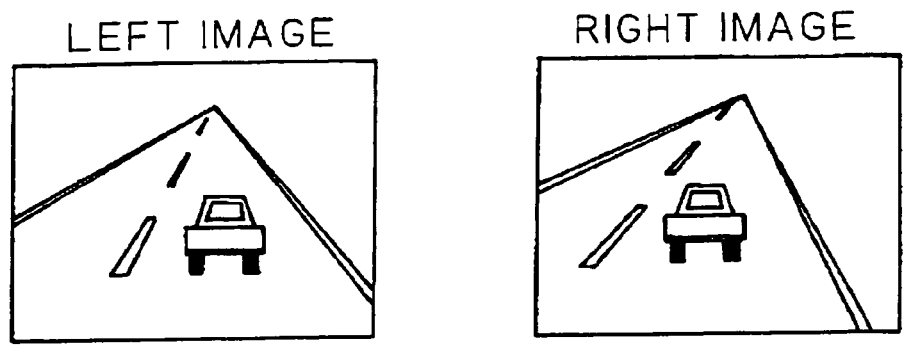
FIG. 43 is a diagram for explaining an obstacle detection processing in the detection unit 4.
Figure 43:
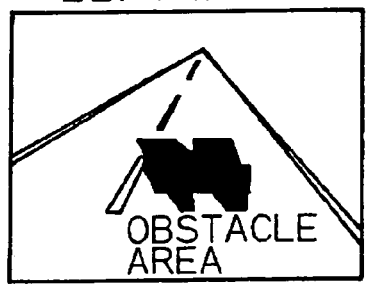
Figure 44:
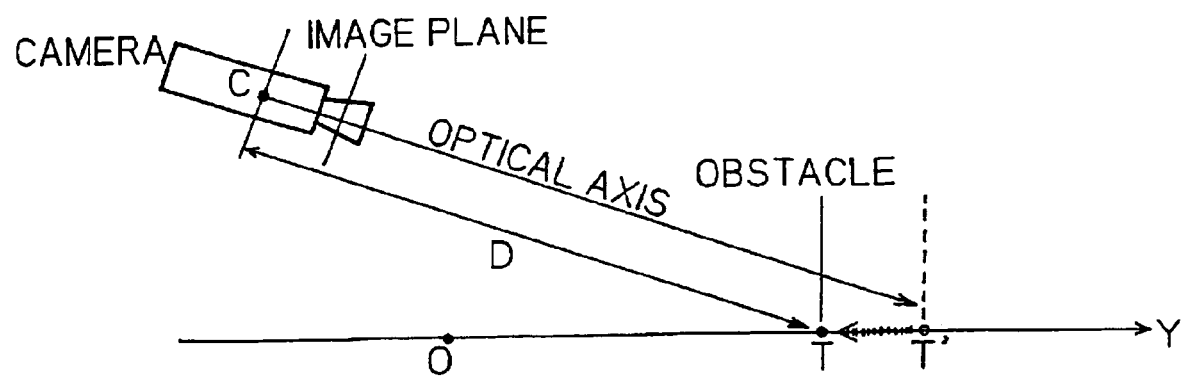
FIG. 44 is a diagram for explaining a depth.

From the stereo images shown in FIG. 43, for example, there is detected an obstacle region, as shown in the lower side of FIG. 43.

(Contract Time Measurement Unit 5)

The contact time measurement unit 5 measures the time (i.e., the time to contact) for the own vehicle to contact with the obstacle, from the locus (or the time change of the location of the obstacle) of the obstacle on one image (as will be called the "standard image" which is exemplified by the left image in Embodiment 4) of the stereo images.

First of all, the time to contact will be described in the following.

The denominator of Equation (1) is designated by D. That is:

$$D = h_{31}X + h_{32}Y + t_3 \quad (5).$$

The denominator D indicates the distance, i.e., the depth in the optical axis between a contact point T (X, Y) of the obstacle with the ground plane and the view point C of the standard camera.

The depths of the contact points T' and T of the obstacle with the ground plane at instants t–dt and t are designated by D' and D, respectively. Here, the time period, for which the depth becomes 0 when the obstacle continues movements between the instants t–dt and t with respect to the own vehicle coordinate system, is defined by a time to contact $t_c$.

Figure 45:
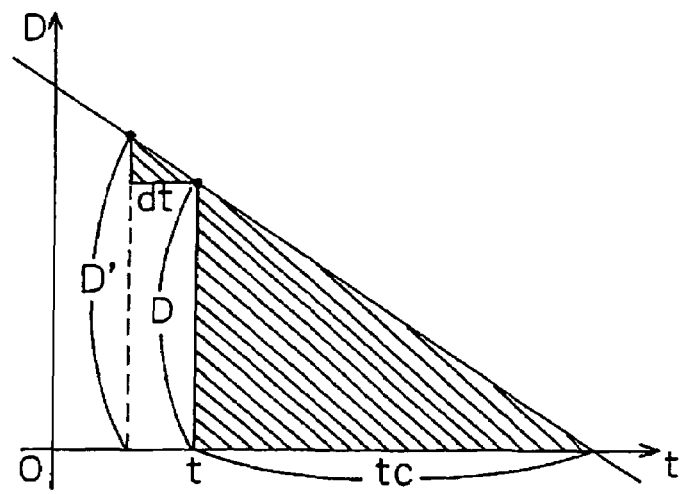
FIG. 45 is a diagram (1) for explaining a time to contact.

FIG. 45 shows the time change in the depth.

The time period from the present time t to the time for the depth to become 0 is the time to contact $t_c$, as illustrated in FIG. 45. From the similar relation of the two hatched triangles, the following relation is obtained:

$$\text{from } \frac{t_c}{D} = \frac{dt}{D' - D} \quad (6)$$

$$t_c = \frac{D}{D' - D} dt = \frac{1}{D'/D - 1} dt = \frac{1}{\gamma - 1} dt \quad (7)$$

wherein $\gamma = D'/D$.

In short, the time to contact tc can be determined from the ratio $\gamma$ of the depth between the two times.

Here will be described the method for computing the time to contact, from the positions of the obstacle regions at the individual times, as determined by the detection unit 4.

Figure 46:
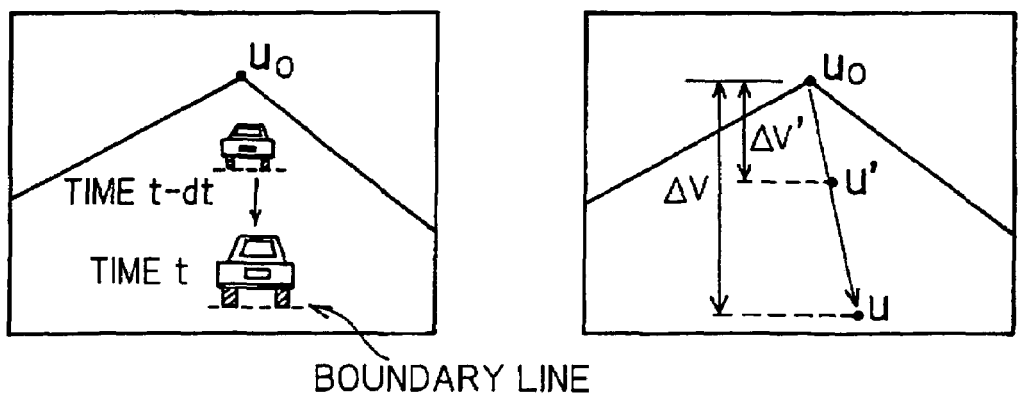
FIG. 46 is a diagram (2) for explaining the time to contact.

It is assumed that the obstacle region is detected, as shown in FIG. 46, on the standard image at the present time t and the preceding time t–dt, and that an arbitrary point on the lowermost line (or the boundary line between the obstacle region and the ground region) detected at the time t is expressed by u=(u, v). The position u'(u', v') of the point u=(u, V) at the time t–dt can be determined as the point of intersection between the straight line joining the points u0 and u and the boundary line at the time t–dt between the obstacle region and the ground region.

On the other hand, it is assumed that the locations of the obstacle on the ground plane at the times t–dt and t are expressed by X'=(X, Y+dY) and X=(X, Y).

In Embodiment 4, it is assumed that the own vehicle and the obstacle move in the Y-axis (or in the same traveling direction), so that the obstacle at individual times is located to have the same X-coordinate. The depth to the point X' is expressed, as follows:

$$\text{From formula (1), } D' = h_{31}X + h_{32}(Y + dY) + t_3 \quad (8)$$

$$\begin{cases} Dv = h_{21}X + h_{22}Y + t_2 \\ D'v' = h_{21}X + h_{22}(Y + dY) + t_2 \end{cases} \quad (9)$$

From the foregoing two formulae as well as formulae (5) and (8), $$D'v' - Dv = h_{22}(Y' - Y) = \frac{h_{22}}{h_{32}}(D' - D) \quad (10)$$

Here, the projected point of the infinite point on the straight lines l and l' parallel to the Y-axis is expressed by u0=(u0, v0). $Y \to \infty$ in Equation (1):

$$u = \frac{h_{11}X/Y + h_{12} + t_1/Y}{h_{31}X/Y + h_{32} + t_3/Y} \to \frac{h_{12}}{h_{32}} = u_0 \quad (11)$$

-continued $$v = \frac{h_{21}X/Y + h_{22} + t_2/Y}{h_{31}X/Y + h_{32} + t_3/Y} \to \frac{h_{22}}{h_{32}} = v_0 \qquad (12)$$

when $v_0 = h_{22}/h_{32}$ is substituted for formula (10), $$D'(v' - v_0) = D(v - v_0) \qquad (13)$$

$$\gamma = \frac{D'}{D} = \frac{v - v_0}{v' - v_0} \qquad (14)$$

By substituting this value γ into Equation (7), it is possible to compute the time to contact of the obstacle.

In short, the time to contact of the obstacle to move on the ground plane, as shown in FIG. 46, can be computed exclusively from the locations u' and u of the contact point between the obstacle and the ground plane at the times t−dt and t and the vanishing point u0 of the straight lines 1 and 1' and are not dependent upon the locations of the cameras with respect to the own vehicle coordinate system and the positions of the cameras.

Thus, neither using the camera parameters nor performing the search of the depth, the obstacle on the ground plane can be detected from the stereo cameras on the vehicle, and the time period for the obstacle to contact with the own vehicle can be computed.

(Effects of Embodiment 4)

According to Embodiment 4, as has been described hereinbefore, the stereo images taken by the stereo cameras are processed to detect the obstacle in dependence upon the presence or absence of the height from the ground plane. Without being influenced by the fluctuation of the brightness or the influence of the shadow, therefore, it is possible to detect the obstacle such as the preceding vehicle or the pedestrian from the images. Moreover, it is possible to eliminate the calibrations requiring a long time and much work and the depth search (or the corresponding search) of the high computation cost, which have troubled the stereo vision of the prior art, so that high practical effects can be obtained.

<Modification 4-1>

In Embodiment 4, the image input unit 1 inputs two images by arranging the two TV cameras transversely, which may be vertically arranged.

On the other hand, there may be arranged three or more cameras.

<Modification 4-2>

The feature extraction unit 3 has been described on the case in which the two lines on the ground plane are to be extracted, but three or more lines may be extracted. Alternatively, a line absent from the ground plane, such as the line on a guard rail may be extracted if the direction vector is identical.

<Modification 4-3>

Figure 47:
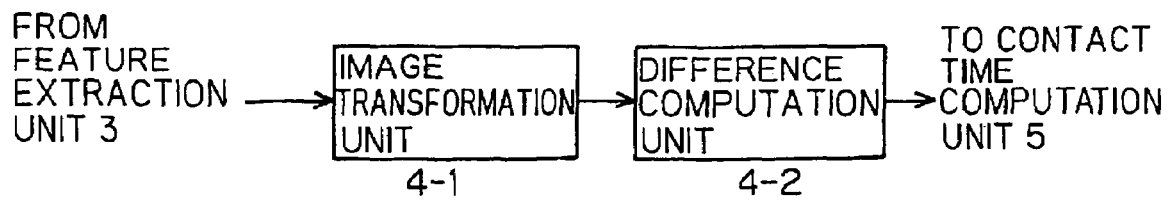
FIG. 47 is a block diagram of a modification of the detection unit 4.

The detection unit 4 can take a construction shown in FIG. 47.

Here, the construction is made of an image transformation unit 4-1 and a difference computation unit 4-2.

The image transformation unit 4-1 transforms a right image in accordance with the following procedure. Generally, the image can be expressed as a function f(u, v) which uses the point (u, v) on the image as a variable and which has an intensity defined for each point. In the following, the image is thus expressed.

Figure 48:
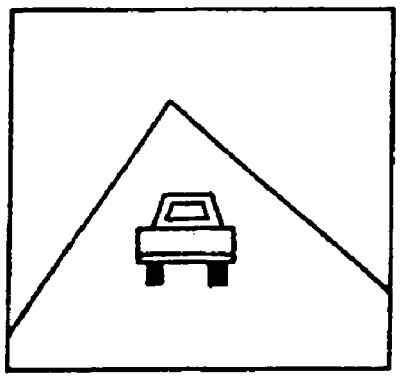
FIG. 48 shows stereo images.
Figure 48:
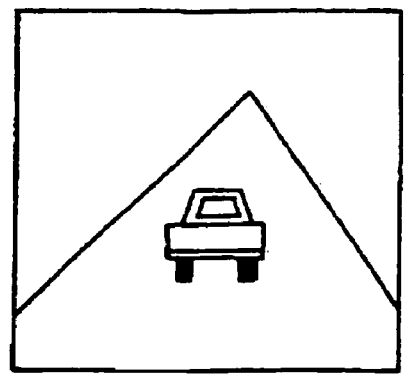

It is assumed that a stereo image shown in FIG. 48 is inputted, and the right image expressed by g(u, v) and the transformed image expressed by g'(u, v) are determined. This image g'(u, v) is determined in the following manner.

$$g'(u, v) = g(u_r, v_r) \qquad (15)$$

wherein $(u_r, v_r)$ is determined from Equation (3). Here, the image g'(u, v) is one which is obtained by the left camera when it is assumed that all the points on the image g(u, v) exist on the ground plane.

Figure 49:
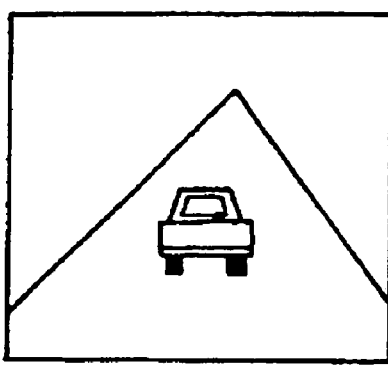
FIG. 49 is a diagram for explaining a right image and its transformed image.
Figure 49:
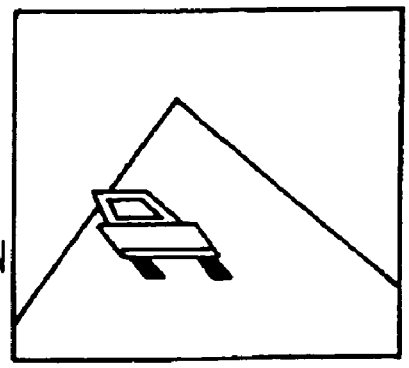

From the right image of FIG. 49, for example, there is obtained the transformed image, as shown in FIG. 49.

Figure 50:
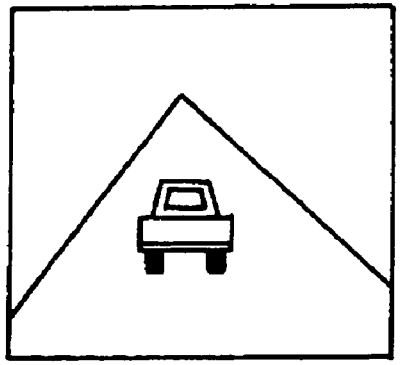
FIG. 50 is a diagram for explaining a left image and the transformed image of a right image.
Figure 50:
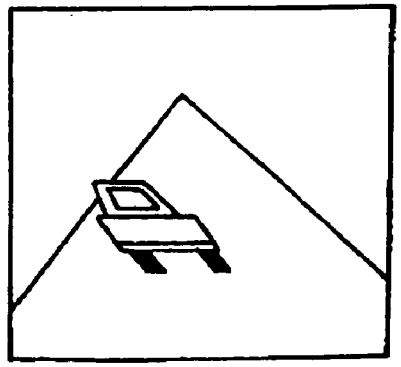

As shown in FIG. 50, the projected points of a point on the ground plane are identical between the left image and the transformed image, but a point non-existing on the ground plane, i.e., a point on the obstacle (i.e., the preceding vehicle in this case) is projected at a location difference according to the height from the ground.

Therefore, the obstacle on the ground plane is detected by taking a difference between the left image and the transformed image. Specifically, the left image is expressed by f(u, v). Unless Diff'=0 or if Diff'>Thr (Thr: a preset threshold value) considering the error, the point (u, v) belongs to the obstacle region:

$$\mathit{Diff'} = |f(u,v) - g'(u,v)| \quad (|\cdot|: \text{Absolute value}) \qquad (16)$$

<Modification 4-4>

The detection unit 4 detects the difference between the two images by taking the pixel difference, but may detect the difference by setting a window of (2w+1)×(2w+1) for each point, from the average, the dispersion or a normalized cross correlation of the intensities in the window.

The correlation C of the point (u, v) of two images F(u, v) and G(u, V) can be computed from the following Formula:

$$C = \frac{1}{N} \sum_{\eta=-\omega}^{\omega} \sum_{\xi=-\omega}^{\omega} \frac{(F(u+\xi, v+\eta) - a_1)(G(u+\xi, v+\eta) - a_2)}{\sigma_1 \sigma_2} \qquad (17)$$

wherein: N=(2w+1)×(2w+1); a1 and a2 designate the averages of the intensities in the window of the two images; $\sigma_1^2$ and $\sigma_2^2$ designate the variances in the intensities in the window of the two images; and $-1 \leq C \leq 1$.

In this case, it is decided that the point (u, v) for C<Thr belongs to the obstacle region. Here, Thr ($\leq 1$) designate a present threshold value.

<Modification 4-5>

In Embodiment 4, the two white lines on the two ground ends are extracted as the straight lines, but the white lines are curves when the ground is curved.

In this case, the obstacle can be likewise detected if the white lines are extracted as the curves.

<Modification 4-6>

The description has been made assuming that the ground plane is flat, but the obstacle can be detected as in the case of the flat plane even for the curved plane.

<Modification 4-7>

The movements parallel to the lane have been assumed for the own vehicle and the obstacle. However, the obstacle detection system can also be applied to the case in which the movements are not parallel (e.g., when the lane is to be changed).

<Modification 4-8>

Although Embodiment 4 has been described on the obstacle detection from the cameras mounted on the vehicle, it could be applied to the autonomous run of a moving robot, for example, but this method should not be limited to the obstacle detection from the vehicle-mounted cameras.

<Modification 4-9>

Although the description has been made on the case in which the stereo cameras are disposed in front of the vehicle to detect the forward obstacle, the cameras can be disposed on the side or at the back of the vehicle to detect the obstacle in each direction.

<Modification 4-10>

The contact time measurement unit 5 can warn the driver in voices of a different volume or tone in accordance with the duration of the contact time when the computed time to contact with the obstacle is short.

<Modification 4-11>

The camera parameters of the vehicle-mounted stereo cameras are assumed to be invariable during the traveling. If variable, however, the obstacle can be detected if the ground plane constraint is updated, to compute the contact time.

INDUSTRIAL APPLICABILITY

According to the invention, an obstacle is detected depending upon the presence or absence of the height from the ground plane so that the obstacle such as a preceding vehicle or a pedestrian can be detected from images independently of the fluctuation of brightness or the influence of a shadow. On the other hand, the constraint to hold in the geometric relation between the ground plane and individual cameras is determined from only two white lines of the two ground ends so that the obstacle on the ground plane can be quickly detected to provide high practical effects even with the vibration during the traveling or the inclination of the ground plane.

Even when the vibration occurs in the traveling own vehicle or when the ground being traveled has an inclination, on the other hand, the true obstacle on the ground plane can be stably detected without erroneously detecting the pattern drawn on the ground plane being traveled.

Moreover, the stable obstacle detection can be made without being influenced by the vibration to be applied to the image pickup units or the inclination of the ground plane being traveled.

On the other hand, the images taken by a plurality of cameras are processed to detect the obstacle in dependence upon the presence or absence of the height from a plane in a three-dimensions, so that the obstacle can be detected from the images without being influenced by the fluctuation in the brightness or the shadow. On the other hand, high practical effects can be obtained because there are unnecessary the camera calibrations requiring a long time and much work and the depth search (or the corresponding search) of the high computation cost, which have troubled the stereo vision of the prior art.

What is claimed is:

1. An obstacle detection system comprising:
   a plurality of image pickup units having light receiving units disposed on a driver's own vehicle at a substantial spacing from each other for taking regions, to which the light receiving units are directed, simultaneously as images;
   an image storage unit for storing the images taken by said image pickup units;
   a feature extraction unit for extracting such ones of the regions taken by said image pickup units as correspond to parallel members disposed generally in parallel with each other on a plane, as can be traveled by said own vehicle, from a first image taken by a first image pickup unit and a second image taken by a second image pickup unit, as stored in said image storage unit, to determine intersection points at which said extracted regions intersect in said first and second images;
   a difference detection unit for determining a corresponding region in the second image, as corresponding to an arbitrary region in said first image, assuming that said arbitrary region is arising from said plane, using an epipolar constraint between said extracted regions of said first and second images, to compare intensities of said arbitrary region and said corresponding region, thereby to extract a region having a substantially different intensity as an obstacle region and obtain an obstacle region image therefrom; and
   a height computation unit for extracting polygonal regions, as composed of an intensity higher than a standard value, of said obstacle region image thereby to detect as a true obstacle region said polygonal region of a threshold is determined by a higher value of a ratio which is determined from a vertical size of said polygonal region in said obstacle region image and a size from a lower end of said polygonal region to scan-line in said obstacle region image including one of said intersection points that is included in said obstacle region image.

2. An obstacle detection system comprising:
   a plurality of image pickup units having light receiving units disposed at a substantial spacing from each other for taking regions, to which the light receiving units are directed, simultaneously as images;
   an image storage unit for storing the images taken by said image pickup units;
   a difference detection unit for determining a corresponding region in a second image, as corresponding to an arbitrary region in a first image, assuming that said arbitrary region is arising from a plane in a three-dimensional space, to compare intensities of said arbitrary region and said corresponding region, thereby to extract a region having a substantially different intensity as an obstacle region and obtain an obstacle region image therefrom; and
   A height computation unit for extracting a polygonal region, as composed of an intensity higher than a standard value, of said obstacle region image thereby to detect as a true obstacle region said polygonal region of a threshold is determined by a higher value of a ratio which is determined from a vertical size of said polygonal region in said obstacle region image and a size from a lower end of said polygonal region to a scan-line set in said obstacle region image.

3. An obstacle detection method comprising:
   a plurality of image pickup steps of taking regions, to which light receiving units disposed on a driver's own vehicle at a substantial spacing from each other are directed, simultaneously as images;
   an image storage step of storing the images taken by said image pickup steps;

a feature extraction step of extracting such ones of the regions taken by said image pickup steps as correspond to parallel members disposed generally in parallel with each other on a plane, as can be traveled by said own vehicle, from a first image taken by a first image pickup step and a second image taken by a second image pickup step, as stored in said image storage step, to determine a point of intersection at which said extracted regions intersect in said first and second images;

a difference detection step of determining a corresponding region in the second image, as corresponding to an arbitrary region in said first image, assuming that said arbitrary region is caused by said plane, using an epipolar constraint between said extracted regions of said first and second images, to compare intensities of said arbitrary region and said corresponding region, thereby to extract a region having a substantially different intensity as an obstacle region and obtain an obstacle region image therefrom; and a height computation step of extracting a polygonal region, as composed of an intensity higher than a standard value, of said obstacle region image thereby to detect as a true obstacle region said polygonal region of a threshold is determined by a higher value of a ratio which is determined from a vertical size of said polygonal region to a scan-line in said obstacle region image including one of said intersection points that is included in said obstacle region image.

4. An obstacle detection method comprising:

a plurality of image pickup steps of taking regions, to which light receiving units disposed at a substantial spacing from each other are directed, simultaneously as images;

an image storage step of storing the images taken by said image pickup steps;

a difference detection step of determining a corresponding region in a second image, as corresponding to an arbitrary region in a first image, assuming that said arbitrary region is caused by a plane in a three-dimensional space, to compare intensities of said arbitrary region and said corresponding region, thereby to extract a region having a substantially different intensity as an obstacle region and obtain an obstacle region image therefrom; and a height computation step of extracting a polygonal region, as composed of an intensity higher than a standard value, of said obstacle region image thereby to detect as a true obstacle region said polygonal region of a threshold is determined by a higher value of a ratio which is determined from a vertical size of said polygonal region in said obstacle region image and a size from a lower end of said polygonal region to a scan-line set in said obstacle region image.

* * * * *